United States Patent
Russell et al.

(10) Patent No.: US 12,196,604 B2
(45) Date of Patent: Jan. 14, 2025

(54) SIGNAL PROCESSING METHODS FOR AN OPTICAL DETECTION SYSTEM

(71) Applicant: SINTELA LIMITED, Bristol (GB)

(72) Inventors: Stuart Russell, Bristol (GB); Andrew Lewis, Bristol (GB); Andris Egle, Bristol (GB)

(*) Notice: Subject to any disclaimer, the term of this patent is extended or adjusted under 35 U.S.C. 154(b) by 390 days.

(21) Appl. No.: 17/766,344

(22) PCT Filed: Oct. 7, 2020

(86) PCT No.: PCT/EP2020/078090
§ 371 (c)(1),
(2) Date: Apr. 4, 2022

(87) PCT Pub. No.: WO2021/069481
PCT Pub. Date: Apr. 15, 2021

(65) Prior Publication Data
US 2023/0073827 A1    Mar. 9, 2023

(30) Foreign Application Priority Data
Oct. 11, 2019  (GB) .................................... 1914743

(51) Int. Cl.
*G01H 9/00*  (2006.01)
*G01D 5/353*  (2006.01)

(52) U.S. Cl.
CPC ......... *G01H 9/004* (2013.01); *G01D 5/35358* (2013.01); *G01D 5/35361* (2013.01)

(58) Field of Classification Search
CPC .............. G01H 9/00–008; G01D 5/353–35396
See application file for complete search history.

(56) References Cited

U.S. PATENT DOCUMENTS 7,030,971 B1 * 4/2006 Payton .................. G01L 11/025
                                                               356/478
9,170,149 B2 * 10/2015 Hartog ................. G01M 11/083
(Continued)

FOREIGN PATENT DOCUMENTS

EP      2053364 A1    4/2009
GB      2489749 A     1/2016
(Continued)

OTHER PUBLICATIONS

International Search Report for corresponding PCT/EP2020/078090, dated Apr. 6, 2021.
(Continued)

*Primary Examiner* — Judy Nguyen
*Assistant Examiner* — James Split
(74) *Attorney, Agent, or Firm* — Egbert, McDaniel & Swartz, PLLC

(57) ABSTRACT

Disclosed is a signal processing method for a distributed acoustic sensing system (DAS), where a scattered signal that was scattered at a scattering location along an optical path is received and interfered with a local oscillator signal to generate a first carrier signal that is modulated by a phase difference between the local oscillator signal and the scattered signal. The first carrier signal is then digitally processed in order to generate a second carrier signal that is modulated by a spatial differential of the phase difference. The spatial differential of the phase difference is directly related to the strain (or acoustic environment) of the optical path at the scattering location, and so enables the strain at the scattering location to be estimated.

22 Claims, 8 Drawing Sheets

(56) References Cited

U.S. PATENT DOCUMENTS

| | | | |
|---|---|---|---|
| 9,435,668 B2* | 9/2016 | Lewis | G01D 5/35387 |
| 11,493,367 B2* | 11/2022 | Carver | G01D 5/35361 |
| 2006/0066839 A1 | 3/2006 | Payton | |
| 2012/0067118 A1 | 3/2012 | Hartog et al. | |
| 2018/0259385 A1 | 9/2018 | Cedilnik | |

FOREIGN PATENT DOCUMENTS

| | | | |
|---|---|---|---|
| WO | 2016/117044 A1 | 8/2017 | |
| WO | 2018134137 A1 | 7/2018 | |

OTHER PUBLICATIONS

Written Opinion of the International Searching Authority for corresponding PCT/EP2020/078090, dated Apr. 6, 2021.
UK IPO Search Report for priority application No. 1914743.8, dated Apr. 15, 2020.

* cited by examiner

SIGNAL PROCESSING METHODS FOR AN OPTICAL DETECTION SYSTEM

TECHNICAL FIELD

The invention relates to signal processing methods for an optical detection system, and systems for carrying out such processing.

BACKGROUND TO THE INVENTION

Distributed Acoustic Sensing (DAS) is an established technology with several commercial systems available. In these systems, a pulse or pulses of laser light are launched into a length of optical fiber and the light that is scattered within the fiber is analysed in order to derive the nature of the acoustic environment, i.e. any physical vibrations, of the fiber transducer. In particular, these systems typically make a measurement of the acoustic strain environment of an optical fiber transducer using an optical time domain reflectometer (OTDR) approach. This gives a differential strain measurement as a function of position along the optical fiber.

As an optical fiber is manufactured it is cooled or quenched from a high temperature as it is drawn. This process leads to the presence of small variations in the density of the optical fibre. These tiny variations in density equate to variations in the effective refractive index of the fiber. These discontinuities lead to scattering of laser light passing through the optical fiber, particularly by Rayleigh scattering. The amplitude of the scattering follows a Rayleigh distribution, but the phase angle of the scattering is uniformly distributed around a unit circle, i.e. $-\pi \leq \Phi \leq \pi$ where $\Phi$ is the phase angle.

For a single pulse system the length of the fiber limits the pulse repetition frequency (PRF) possible, as only one laser light pulse should interrogate the fiber at a given time. Therefore, a pulse is only sent down the optical fiber when the previous pulse has had time to travel the full length of the fiber and the scattered light return to the detector. As a result, the acoustic environment at any location of the fiber can only be sampled at the PRF and this sets an inherent limit on the maximum acoustic frequency that can be sampled with a single pulse system, related to the Nyquist limit.

Many systems only measure the amplitude of the light scattered by the fiber, which yields a result that correlates to the acoustic field only for small amplitude strains and only when correct fiber scatter bias conditions, i.e. the resulting scatter amplitude and phase as a result of the coherent sum of the scattering of light from all of the scattering sites which are illuminated at a given time, are met. For large acoustic strains or incorrect fiber scatter bias conditions these systems significantly distort the measurement of the acoustic field leading to the generation of higher frequency components which do not truly represent the amplitude or time evolution of the vibrations which are affecting the optical fiber. Systems of this nature however do give a measure of the acoustic energy and have found application for long range installations such as pipeline monitoring and borders, where detection of activity is the primary goal and a truly accurate measurement of the acoustic field is not required. Systems of this nature can be termed 'qualitative' systems. Operational ranges of less than 50 km, and spatial resolutions of the order of more than 20 m at these ranges are typical for such systems.

Other systems simultaneously measure the amplitude and phase of the scattered light, typically by comparing the phase of two sequential pulses or by comparing the phase of one pulse with a delayed copy of itself. In each case, said pulses are allowed to optically interfere and the resulting interference is measured. These systems yield a response which is generally linearly related to the acoustic field and the response provides a much higher dynamic range. Such systems are therefore able to represent much larger strains in the optical fiber and with much greater correlation to the acoustic field than 'qualitative' methods as described above. However, typically the operational range of systems of this nature is limited and therefore are targeted at shorter range applications, for example down hole seismic measurements. Systems of this nature can be termed 'quantitative' systems. Operational ranges of 10 km or less, and spatial resolutions of the order of 10 m are typical for such systems.

Another way of measuring the amplitude and phase of the scattered light in a 'quantitative' system is to use a local oscillator reference signal and measure the phase of the scattered light in relation to this reference. This method is termed coherent detection. Coherent detection has found application in communications and sensors in various forms over the past 30 years. It offers not only a coherent measurement of both phase and amplitude but also a detection noise floor much lower than direct detection methods and hence the potential for improved range and spatial resolution performance when compared to other commercial systems. However the traditional signal processing approach to employing coherent detection to build a DAS system leads to issues which limit these inherent advantages.

The present invention aims to overcome problems with known signal processing techniques applied in acoustic sensing.

SUMMARY OF THE INVENTION

At its most general, the present invention provides a signal processing method for a distributed acoustic sensing system (DAS), where a scattered signal that was scattered at a scattering location along an optical path is received and interfered with a local oscillator signal to generate a first carrier signal that is modulated by a phase difference between the local oscillator signal and the scattered signal. The first carrier signal is then digitally processed in order to generate a second carrier signal that is modulated by a spatial differential of the phase difference. The spatial differential of the phase difference is directly related to the strain (or acoustic environment) of the optical path at the scattering location, and so enables the strain at the scattering location to be estimated.

By digitally processing the received scattered signal according to the invention, it may be possible to increase the distance over which strain measurements can be accurately performed. For example, the invention may enable a DAS system having an operational range of more than 60 km and a spatial resolution of 10 m or less to be implemented. In particular, such systems may be adapted to extend the operational range to 80 km or more, or improve the spatial resolution to 1 m or less. This may be chosen by an end user dependent on application.

According to a first aspect of the invention, there is provided a signal processing method for a distributed acoustic sensing system, the method comprising: transmitting a pulsed test signal along an optical path; receiving, at a detector stage, a scattered signal that was scattered at a location along the optical path; receiving, at the detector stage, a local oscillator signal; generating, based on an interference of the scattered signal and the local oscillator signal, a first complex carrier signal that is modulated by a phase difference between the local oscillator signal and the scattered signal; processing the first complex carrier signal to generate a second complex carrier signal that is modulated by a spatial differential of the phase difference, the spatial differential being taken along a length of the optical path; and determining, based on the second complex carrier signal, a value representative of the spatial differential of the phase difference for the location along the optical path.

Conventionally, methods for estimating strain at a location on the optical path may involve passing the first complex carrier signal through a rectangular to polar coordinate converter, to obtain a value of the phase difference. The phase difference may then be spatially differentiated, in order to obtain an estimate of the strain or acoustic environment at the location along the optical path. However, the inventors have found that issues arise with such methods when the length of the optical path is extended. This is because, as the length of the optical path is increased, the level of the scattered signal is reduced and the signal-to-noise ratio of the signal drops to a level where it approaches a non-linear threshold of the rectangular-to-polar (R-P) coordinate converter. A known method to avoid this limit is to reduce the demodulation bandwidth, hence reducing the noise in band and increasing the SNR prior to R-P coordinate transform. However, the inventors have realised that the phase difference carried by the first carrier signal is a cumulative phase corresponding to a cumulative sum of all phase modulations occurring along the optical path up to the location where the scattered signal was scattered. As a result, this can lead to 'overscale' problems when increasing the length of the optical path and not maintaining a full Nyquist demodulation bandwidth, as the system may no longer be able to track the phase change due to the large cumulative phase along the optical path.

The inventors have found that by processing the first complex carrier signal to generate a second complex carrier signal that is modulated by a spatial differential of the phase, the issues mentioned above may be avoided, as the spatial differential of the phase may be directly determined from the second complex carrier signal. As a result, it may be possible to accurately perform distributed acoustic sensing over longer optical paths and with higher resolution.

The pulsed test signal may include a series of coherent light pulses which are separated by regular time intervals. A pulse repetition frequency (PRF) of the pulsed test signal may be determined based on a length of the optical path, e.g. such that only a single pulse travels along the optical path at one time. The DAS may include a pulse generator (e.g. an acousto-optic modulator) configured to generate the pulsed test signal.

The optical path may include an optical fiber, which may act as a transducer of the DAS.

The optical path (e.g. optical fiber) may include a plurality of scattering sites distributed along the length of the optical path, e.g. caused by variations in refractive index along the length of the optical path. When a pulse of the pulsed test signal travels along the optical path (e.g. optical fiber), light in the pulse may be scattered at various locations (i.e. at the scattering sites) along the length of the optical path. For example, light in the pulse may be backscattered via Rayleigh scattering of the pulse at various locations along the length of the optical path. Scattering of light in the pulse at a location along the optical path may result in a scattered signal associated with that location. Thus, a pulse of the test signal travelling along the optical path may result in a plurality of scattered signals, each scattered signal having been scattered at a respective location (i.e. scattering site) along the optical path. The scattered signals may be guided back along the optical path, such that they are received by the detector stage.

The optical path (e.g. optical fiber) may be subjected to one or more modulations, such as acoustic modulations, at one or more locations along the optical path. Such modulations may result in a strain at one or more locations along the optical path, which may cause changes in the scattering of the pulsed test signal, e.g. due to local variations in refractive index and length of the optical path.

The location on the optical path at which the scattered signal was scattered may be determined based on a time of receipt of the scattered signal at the detector stage. For example, the location on the optical path may be determined by comparing a time at which a pulse of the test signal was launched along the optical path, and the time of receipt of the scattered signal at the detector stage, taking into account the speed of light along the optical path.

The DAS includes a detector stage that is arranged to receive scattered signals from the optical path and the local oscillator signal. The detector stage may include an optical detector which is arranged to output a signal that is representative of an intensity of incident light on the detector. For example, the detector stage may include a square law detector. A square law detector may output a signal having an intensity that is proportional to the square of the field amplitude of incident light on the detector. The detector stage may also be referred to herein as a detector system.

The local oscillator signal may be a continuous wave coherent light signal that is interfered with the received scattered signal at the detector stage.

Both the local oscillator signal and the scattered signal may be incident on the detector of the detector stage, such that they interfere at the detector. As a result, the detector (e.g. square law detector) may produce an output signal that is related to an intensity produced by the interference of the local oscillator signal and the scattered signal. The output signal from the detector may be in the form of a carrier signal (e.g. a real carrier signal) that carries a phase difference between the scattered signal and the local oscillator signal. The first complex carrier signal may then be generated based on the output signal. For example, generating the first complex carrier signal may include passing the output signal through a digital down conversion stage. Thus, the first complex carrier signal is also modulated by a phase difference between the local oscillator and the scattered signal.

Scattering of the pulsed test signal along the optical path may result in a phase shift of the scattered signal relative to the local oscillator. As a result, a scattered signal that was scattered at a location along the optical path may have a phase relative to the local oscillator that corresponds to a cumulative sum of any and all phase modulations along the length of the optical path up to that location. Therefore, the phase difference carried by the first complex carrier signal may correspond to a cumulative sum of phase modulations along a length of the optical path up to the location where the scattered signal was scattered.

The first complex carrier is digitally processed to generate a second complex carrier signal that is modulated by a spatial differential of the phase difference. The spatial differential may represent a variation of the phase difference over a chosen length increment (or gauge length) of the optical path, at the location along the optical path where the scattered signal was scattered. As a result, it is possible to determine a value representative of the spatial differential of the phase difference for the location along the optical path, which may enable the strain or acoustic environment of the optical path to be determined.

Herein, a length increment, gauge length, or delay may be referred to as "chosen" to indicate that it may be set by a user. A "chosen" length increment, gauge length, or delay may also be said to be "predetermined".

The DAS may include a coherent light source which is configured to emit continuous wave coherent light. Light emitted by the coherent light source may be split (e.g. by a beam-splitter) between two paths, so that a first portion of the light from the coherent light source is transmitted along a local oscillator path, and a second portion is transmitted a pulse generator which is configured to generate the pulsed test signal.

In some embodiments, the DAS may be a heterodyne detection system, in which case a frequency of the pulsed test signal may be shifted relative to a frequency of the local oscillator signal. In other embodiments, the DAS may be a homodyne detection system, in which case the frequency of the pulsed test signal and the local oscillator signal may be the same.

The DAS system may be a polarisation diverse system. For example, the local oscillator signal or the scattered signal may be split into components having different polarisations, e.g. vertical and horizontal polarisation. The detector stage may then include a detector for each polarisation state, such that a separate analysis of the signals may be performed for each polarisation state. This may serve to ensure that interference of the scattered signal and local oscillator signal can be detected for at least one of the polarisation states, e.g. in cases where polarisation of the scattered signal varies relative to polarisation of the local oscillator signal.

The determining step may include applying a rectangular-to-polar (R-P) coordinate transform to the second complex carrier signal. This may yield a phase and amplitude of the second complex carrier signal, the phase providing a value that is representative of the spatial differential of the phase difference for the location along the optical path. By applying the R-P coordinate transform to the second complex carrier signal, rather than directly to the first complex carrier signal, it is possible to accurately determine the spatial differential of the phase difference, and avoid issues caused by 'overscale' of the cumulative phase difference and allows the demodulation bandwidth to be reduced prior to the R-P transform. In particular, this may avoid having to take a spatial differential of the cumulative phase carried by the first complex carrier signal after the R-P transform, which could lead to an incorrect estimate of the strain or acoustic environment of the optical path.

Applying the rectangular to polar coordinate transform to the second complex carrier signal may include passing the second complex carrier signal through a digital down conversion stage. For example, the second complex carrier signal may be passed through a digital down conversion stage prior to applying the rectangular to polar coordinate transform.

The step of processing the first complex carrier signal may comprise multiplying a complex conjugate of the first complex carrier signal with a delayed copy of the first complex carrier signal, to generate the second complex carrier signal. The inventors have found that processing the first complex carrier signal in this manner results in a second complex signal that is modulated by the spatial differential of the phase difference. The delayed copy of the first complex carrier signal may be delayed by an amount corresponding to a chosen length increment (or gauge length) of the optical path relative to the complex conjugate of the first complex carrier signal. In practice, this may be achieved by applying a time delay to the copy of the first complex carrier signal, where the time delay corresponds to the desired gauge length (e.g. based on a speed of the signal along the optical path). The length increment may be set according to a desired spatial resolution of the measurement.

In some embodiments, the step of processing the first complex carrier signal may comprise digitally simulating interference of the first complex carrier signal with a delayed copy of the first complex carrier signal, to generate the second complex carrier signal. The inventors have realised that by digitally simulating interference in this manner, it is possible to obtain a second complex signal that is modulated by the spatial differential of the phase difference. Additionally, by digitally simulating Interference in this manner, it is possible to avoid the cost and complications of using additional optical components that may be required to achieve similar effects optically. The second complex carrier signal may correspond to a simulated output signal of a detector (e.g. a square law detector) at which the first complex carrier signal and its delayed copy interfere. The delayed copy of the first complex carrier signal may be delayed (i.e. shifted) by a chosen length increment (or gauge length) of the optical path relative to the first complex carrier signal. The length increment may be set according to a desired spatial resolution of the measurement.

The inventors have realised that multiplying a complex conjugate of the first complex carrier signal with a delayed copy of the first complex carrier signal is equivalent to digitally simulating interference of the first complex carrier signal with a delayed copy of the first complex carrier signal. Multiplying the complex conjugate of the first complex carrier signal with a delayed copy of the first complex carrier signal may be computationally simpler than digitally simulating interference of the first complex carrier signal with a delayed copy of the first complex carrier signal.

Digitally simulating interference of the first complex carrier signal with a delayed copy of the first complex carrier signal may comprise: generating a copy of the first complex carrier signal, wherein a frequency shift is introduced between the first complex carrier signal and the copy of the first complex carrier signal, and wherein the copy of the first complex carrier signal is delayed relative to the first complex carrier signal; adding the first complex carrier signal and the delayed copy of the first complex carrier signal together to produce a summed complex carrier signal; and multiplying the summed complex carrier signal with a complex conjugate of the summed complex carrier signal, to generate the second complex carrier signal. Such digital simulation of the interference may effectively simulate interference of the first complex carrier signal with the delayed copy of the first complex carrier signal at a square law detector. The frequency shift may be implemented, for example, by shifting a frequency of the first complex carrier by a first frequency $F_1$ and shifting a frequency of the copy of the first complex carrier by a second frequency $F_2$.

The frequency shift may be larger than the difference between $F_1$ and $F_2$ and allow adequate bandwidth required to represent scattering (e.g. Rayleigh scattering) of the test signal along the optical path. The difference frequency $|F_2-F_1|$ may also allow adequate bandwidth to represent the Rayleigh scatter.

In some embodiments, the pulsed test signal may include a first test pulse and a second test pulse, wherein the second test pulse is delayed relative to the first test pulse and the first test pulse and the second test pulse have different frequencies; the scattered signal may include a first scattered signal (or first scattered pulse) corresponding to the first test pulse and a second scattered signal (or second scattered pulse) corresponding to the second test pulse; the step of generating a first complex carrier signal may include generating a first complex carrier signal associated with the first scattered pulse and a first complex carrier signal associated with the second scattered pulse; the step of processing the first complex carrier signal may include processing the first complex carrier signal associated with the first scattered pulse and the first complex carrier signal associated with the second scattered pulse to generate the second complex carrier signal. The delay between the first test pulse and the second test pulse may be set based on a desired gauge length for the spatial differential of the phase difference. Indeed, the delay between the first test pulse and the second test pulse may correspond to a gauge length of the spatial differential of the phase difference.

The first test pulse and the second test pulse may be pulses of coherent light, each having a different respective frequency. The first scattered pulse may include scattered light from the first test pulse, whilst the second scattered pulse may include scattered light from the second test pulse.

Both the first scattered signal and the second scattered signal may be received simultaneously at the detector stage, where they interfere with local oscillator signal. The first complex carrier signal associated with the first scattered signal may be modulated by a phase difference between the local oscillator and the first scattered pulse. In particular, the first complex carrier signal associated with the first scattered signal may be modulated by a phase difference between the local oscillator signal and the first scattered pulse; and the first complex carrier signal associated with the second scattered signal may be modulated by a phase difference between the local oscillator signal and the second scattered pulse.

The second complex carrier signal may then be generated by processing the first complex carrier signal associated with the first scattered signal and the first complex carrier signal associated with the second scattered signal.

Processing the first complex carrier signal associated with the first scattered signal and the first complex carrier signal associated with the second scattered signal may include multiplying the first complex carrier signal associated with the first scattered signal by a complex conjugate of the first complex carrier signal associated with the second scattered signal. The inventors have found that performing such an operation results in a second complex carrier signal that is modulated by the phase difference between the two scattered signal and, since the two pulses are delayed relative to each other, the spatial differential of the strain along the fiber.

In order to obtain a value representative of the spatial differential for multiple locations along the length of the optical path, the steps of the method of the first aspect of the invention may be performed for each of a set of received scattered signals, where each scattered signal in the set of scattered signals was scattered at a respective location along the optical path. In this manner, the strain and acoustic environment may be determined along the entire length of the optical path. Thus, according to an embodiment of the invention, a signal processing method for a distributed acoustic sensing system may comprise: transmitting a pulsed test signal along an optical path; receiving, at a detector stage, a set of scattered signals, wherein each scattered signal in the set of scattered signals was scattered at a respective location along the optical path; receiving, at the detector stage, a local oscillator signal; and for each of the scattered signals in the set of scattered signals: generating, based on an interference of that scattered signal and the local oscillator signal, a first complex carrier signal associated with that scattered signal, the first complex carrier signal being modulated by a phase difference between the local oscillator signal and that scattered signal; processing the first complex carrier signal to generate a second complex carrier signal associated with that scattered signal, the second complex carrier signal being modulated by a spatial differential of the phase difference, the spatial differential being taken along a length of the optical path; and determining, based on the second complex carrier signal, a value representative of the spatial differential of the phase difference for that location along the optical path.

Having realised that it is possible to obtain the second complex carrier signal that is modulated by the spatial differential of the phase difference, the inventors found that it is possible to further improve signal-to-noise ratio (SNR) of the measurements by performing "vector stacking" of carrier signals over multiple locations along the optical path. Thus, according to a second aspect of the invention, there is provided a signal processing method for an optical detection system, the method comprising: transmitting a pulsed test signal along an optical path; receiving, at a detector stage, a set of scattered signals, wherein each scattered signal in the set of scattered signals was scattered at a respective location along the optical path; receiving, at the detector stage, a local oscillator signal; and for each of the scattered signals in the set of scattered signals: generating, based on an interference of that scattered signal and the local oscillator signal, a first complex carrier signal associated with that scattered signal, the first complex carrier signal being modulated by a phase difference between the local oscillator signal and that scattered signal; processing the first complex carrier signal to generate a second complex carrier signal associated with that scattered signal, the second complex carrier signal being modulated by a spatial differential of the phase difference, the spatial differential being taken along a length of the optical path; and processing the second complex carrier signal to generate a third complex carrier signal associated with that scattered signal, the third complex carrier signal being modulated by a time differential of the spatial differential of the phase difference, the time differential being over a time period between successive pulses of the test signal; summing two or more of the third complex carrier signals to generate a fourth complex carrier signal; determining, based on the fourth complex carrier signal, a value representative of the time differential of the spatial differential of the phase difference for one or more of the respective locations along the optical path.

The method of the second aspect of the invention is based on the method of the first aspect of the invention, and any features described above in relation to the first aspect of the invention may be shared with the second aspect of the invention. Additionally, the method of the second aspect of the invention includes, following generation of the second complex carrier signal, additional processing in order to improve the SNR. In particular, generating, for each of the scattered signals, a third complex carrier signal that is modulated by a time differential of the spatial differential of the phase difference, and then spatially stacking (i.e. summing) the third complex carrier signals may result in a signal with in increased amplitude and thus having an improved SNR, which may facilitate determining a value of the spatial differential of the phase difference for a location along the optical path.

Importantly, the method of the second aspect may result in an improved SNR prior to the determining of a value representative of the time differential of the spatial differential of the phase difference (later integrated to determine the spatial differential of the phase difference), e.g. prior to applying a rectangular to polar coordinate transform to the fourth complex carrier signal. As a result, it may be possible to improve accuracy of measurements for longer optical paths. This is a result of the improved signal-to-noise ratio which avoids the R-P transform threshold which present limitations to known methods, as discussed herein.

The steps of transmitting the pulsed test signal, receiving the scattered signals, receiving the local oscillator signal, generating the first complex carrier signal and processing the first complex carrier signal to generate a second complex carrier signal may be performed as described above in relation to the first aspect of the invention.

The set of scattered signals may include two or more scattered signals. The scattered signals may be received consecutively in time at the detector stage. As mentioned above, the location at which a scattered signal was scattered may be determined based on a time of receipt of the scattered signal at the detector stage.

Each of the scattered signals in the set of scattered signals may be scattered at a respective location along the optical path, wherein each of the respective locations is located within a chosen length of the optical path. The scatter phase and amplitude of a second complex carrier over a given length of optical path may exhibit a certain correlation (or coherence) length due to the averaging nature of the sum of scatter sites enveloped by the optical pulse. This correlation length may be related to a length of a pulse in the pulsed test signal. For example, the correlation length may correspond to a half-length of a pulse in the pulsed test signal. However the inventors have found that the phasor angle and amplitude of the third complex carrier may exhibit a correlation length that exceeds that exhibited by the second complex carrier as defined by the pulse, and is limited only by the extent of the acoustic modulation and the chosen spatial gauge length. A length may then be chosen such that a sum of two or more of the third complex carrier signals remains constructive.

As a result of the processing steps performed for each of the scattered signals in the set of scattered signals, a set of third complex carrier signals is obtained, each of the third complex carrier signals corresponding to a respective scattered signal (and thus scattering location along the optical path). The inventors have found that, by generating the third complex carrier signal which is modulated by a time differential of the spatial differential of the phase difference, it is possible to constructively sum (i.e. spatially stack) multiple third complex carrier signals together, which may lead to an improved SNR.

In particular, a second complex carrier signal may define a vector (or phasor) whose amplitude and angle is proportional to the coherent sum of the scatter sites illuminated at a given position, and whose angular frequency is related to any acoustic modulation occurring at a corresponding location along the optical path. For example, the angular frequency of the phasor may be related to a frequency of a modulation that is applied at a location on the optical path. By modulating the third complex carrier signals by a time differential of the spatial differential of the phase difference, the third complex carrier may define a vector (or phasor) whose amplitude is proportional to the square of the spatial differential carrier amplitude, and whose angle is related to the rate of change of any acoustic modulation at the corresponding location along the optical path. Therefore, for a location which is unperturbed (e.g. there is no strain or acoustic modulation at that location), the angle of the vector defined by the third complex carrier signal may be zero, e.g. it will lie along a "neutral" axis. For a location which is perturbed (e.g. undergoing strain or acoustic modulation), the angle of the vector defined by the third complex carrier signal may be a non-zero angle related to the rate of change of the acoustic modulation.

Accordingly, modulating the third complex carrier signals by a time differential of the spatial differential of the phase difference may have the effect of aligning the vectors defined by the third complex carrier signals, so that the third complex carrier signals can be constructively summed in the spatial dimension. In particular, this may have the effect of aligning vectors corresponding to unperturbed locations along the neutral axis, and aligning vectors corresponding to perturbed locations along a common axis. As a result, summing together third complex carrier signals corresponding to scattered signals that were scattered at similar or adjacent locations may result in a constructive sum of the third complex carrier signal.

The time differential of the spatial differential of the phase difference may correspond to a change (or increment) of the spatial differential of the phase difference over a time period corresponding to an amount of time between successive pulses of the test signal. The time differential (or rate of change) of the spatial differential of the phase difference may be referred to as an "instantaneous frequency".

The step of summing two or more of the third complex carrier signals may correspond to performing a "spatial stack" of the third complex carrier signals, as it involves summing together third complex carrier signals that correspond to different locations along the optical path.

The step of summing two or more of the third complex carrier signals may include summing a set of two or more of the third complex carrier signals, wherein the two or more third complex carrier signals correspond to scattering signals that were scattered at adjacent (or neighbouring) locations along the optical path. This may facilitate obtaining a constructive sum of the two or more third complex carrier signals, which may improve the SNR. For example, the set of two or more third complex carrier signals may include eight third complex carrier signals, each of the eight third complex carrier signals corresponding to scattered signals that were scattered from adjacent locations. The number of third complex carrier signals that are summed together may be selected based on a desired spatial resolution of the measurement, as well as the correlation length of the measurement.

The number of third complex carrier signals included in the set of third complex carrier signals may be determined based on a correlation length of acoustic field along the optical path and the required spatial resolution. The scatter phase and amplitude of a second complex carrier over a given length of optical path may exhibit a certain correlation (or coherence) length due to the averaging nature of the sum of scatter sites enveloped by the optical pulse. This correlation length may be related to a length of a pulse in the pulsed test signal. For example, the correlation length may correspond to a half-length of a pulse in the pulsed test signal. However the inventors have found that the phasor angle and amplitude of the third complex carrier may exhibit a correlation length that exceeds that exhibited by the second complex carrier, as defined by the pulse and is limited only by the extent of the acoustic modulation and on the chosen spatial gauge length. A length may then be chosen such that a sum of two or more of the third complex carrier signals remains constructive.

The fourth complex carrier signal may define a vector that represents the sum of the vectors defined by the two or more third complex carrier signals that were summed together.

The one or more respective locations for which the value representative of the time differential of the spatial differential of the phase difference is determined based on the fourth complex carrier signal may correspond to scattering locations associated with the two or more third complex carrier signals that were summed. For example, the one or more locations may correspond to a portion (length) of the optical path that includes the scattering locations associated with the two or more third complex carrier signals that were summed.

The step of determining a value representative of the time differential of the spatial differential of the phase difference for one or more of the respective locations along the optical path may include applying a rectangular to polar coordinate transform to the fourth complex carrier signal. This may result in a signal that carries information relating to a frequency of a modulation (perturbation) of the optical path at the one or more respective locations. Applying the rectangular to polar coordinate transform to the fourth complex carrier signal may include passing the fourth complex carrier signal through a digital down conversion stage.

A value representative of the spatial differential for a location may be determined by performing a sum (or integral) over time (i.e. over multiple pulses of the pulsed test signal) of the time differential of the spatial differential of the phase difference for that location.

In order to determine the time differential of the spatial differential of the phase difference for multiple locations along the optical path, the generated third complex carrier signals may be split into multiple sets of two or more third complex carrier signals, wherein each set of third complex carrier signal includes third complex carrier signals corresponding to adjacent locations along the optical path. For example, as mentioned above, a set of third complex carrier signals may include third complex carrier signals corresponding to set of locations along the optical path that lie within a single correlation length of the acoustic modulation. Then, for each set of third complex carrier signals, a fourth complex carrier signal may be determined by summing the third complex carrier signals in that set. The fourth complex carrier signal for each set may then be used to determine a time differential of the spatial differential of the phase difference for the corresponding set of locations.

Processing the second complex carrier signal may comprise multiplying a complex conjugate of the second complex carrier signal with a copy of the second complex carrier signal that is delayed by a time period between successive pulses of the pulsed test signal, to generate the third complex carrier signal. The inventors have found that processing the second complex carrier signal in this manner results in the third complex carrier signal being modulated by the time differential of the spatial differential of the phase difference. This may simplify the process of obtaining the time differential of the spatial differential of the phase difference.

In other embodiments, processing the second complex carrier signal may comprise digitally simulating interference of the second complex carrier signal with a copy of the second complex carrier signal that is delayed by a time period between successive pulses of the pulsed test signal, to generate the third complex carrier signal. The inventors have realised that by digitally simulating interference in this manner, it is possible to obtain a third complex signal that is modulated by the time differential spatial differential of the phase difference.

Digitally simulating interference of the second complex carrier signal with a delayed copy of the second complex carrier signal may comprise: generating a copy of the second complex carrier signal, wherein a frequency shift is introduced between the second complex carrier signal and the copy of the second complex carrier signal, and wherein the copy of the second complex carrier signal is delayed relative to the second complex carrier signal by an amount corresponding to the time period between successive pulses of the pulsed test signal; adding the second complex carrier signal and the copy of the second complex carrier signal together to produce a summed complex carrier signal; and multiplying the summed complex carrier signal with a complex conjugate of the summed complex carrier signal, to generate the third complex carrier signal. Such digital simulation of the interference may effectively simulate interference of the second complex carrier signal with the delayed copy of the second complex carrier signal at a square law detector. The frequency shift may be implemented, for example, by shifting a frequency of the second complex carrier by a first frequency $F_1$ and shifting a frequency of the copy of the second complex carrier by a second frequency $F_2$.

The frequency shift may be larger than the difference between $F_1$ and $F_2$ and allow adequate bandwidth required to represent scattering (e.g. Rayleigh scattering) of the test signal along the optical path. The difference frequency $|F_2-F_1|$ may also allow adequate bandwidth to represent the Rayleigh scatter.

A similar vector stacking method to that described above in relation to the second aspect for improving SNR may be used for stacking signals corresponding to different polarisation states, e.g. in cases where a polarisation diverse detection system is used. In other words, instead of stacking signals corresponding to different spatial locations, signals corresponding to different polarisation states may be stacked (i.e. summed). Thus, according to a third aspect of the invention, there is provided a signal processing method for a distributed acoustic sensing system, the method comprising: transmitting a pulsed test signal along an optical path; receiving, at a detector stage, a scattered signal that was scattered at a location along the optical path; receiving, at the detector stage, a local oscillator signal; splitting the local oscillator signal or the scattered signal into a first polarisation state and a second polarisation state; for each of the first polarisation state and second polarisation state: generating, based on an interference of the scattered signal and the local oscillator signal, a first complex carrier signal associated with that polarisation state, the first complex carrier signal being modulated by a phase difference between the local oscillator signal and the scattered signal; processing the first complex carrier signal to generate a second complex carrier signal associated with that polarisation state, the second complex carrier signal being modulated by a spatial differential of the phase difference, the spatial differential being taken along a length of the optical path; and processing the second complex carrier signal to generate a third complex carrier signal associated with that polarisation state, the third complex carrier signal being modulated by a time differential of the spatial differential of the phase difference, the time differential being over a time period between successive pulses of the test signal; and summing the third complex carrier signal associated with the first polarisation state and the third complex carrier signal associated with the second polarisation state to generate a fourth complex carrier signal;

and determining, based on the fourth complex carrier signal, a value representative of the time differential of the spatial differential of the phase difference for the location along the optical path.

The method of the third aspect of the invention is based on the method of the first aspect of the invention, and any features described above in relation to the first aspect of the invention may be shared with the third aspect of the invention. The steps of transmitting the pulsed test signal, receiving the scattered signals, receiving the local oscillator signal, generating the first complex carrier signal and processing the first complex carrier signal to generate a second complex carrier signal may be performed as described above in relation to the first aspect of the invention.

The step of processing the second complex carrier signal to generate a third complex carrier signal may be performed as described above in relation to the second aspect of the invention. Features relating to the generation of the third complex carrier signal, and properties of the third complex carrier signal, discussed above in relation to the second aspect of the invention may be shared with the third aspect of the invention.

By generating, for each polarisation state, a third complex carrier signal that is modulated by a time differential of the spatial differential of the phase difference, it is possible to constructively sum the third complex carrier signal for each polarisation state, which may result in an improved SNR. Indeed, similar to the discussion above in relation to the second aspect of the invention, modulating the third complex carrier signals by the time differential of the spatial differential of the phase difference may effectively align phasors that are representative of the third complex carrier signals, which enables them to be constructively summed.

Therefore, a fourth complex carrier signal, which results from the sum of the third complex carrier signals for each polarisation state may provide an improved SNR, which may facilitate determining a value representative of the time differential of the phase difference for the location along the optical path. The fourth complex carrier signal may be modulated by the time differential of the spatial differential of the phase difference.

Importantly, the method of the third aspect may result in an improved SNR prior to the determining of a value representative of the spatial differential of the phase difference, e.g. prior to applying a rectangular to polar coordinate transform to the fourth complex carrier signal. As a result, it may be possible to improve accuracy of measurements for longer optical paths and or higher spatial resolutions.

The step of determining a value representative of the time differential of the spatial differential of the phase difference may be performed as described above in relation to the second aspect of the invention. In particular, this step may include applying a rectangular to polar coordinate transform to the fourth complex carrier signal. Applying the rectangular to polar coordinate transform to the fourth complex carrier signal may include passing the fourth complex carrier signal through a digital down conversion stage.

A value representative of the spatial differential for the location may include performing a sum (or integral) over time (i.e. over multiple pulses of the pulsed test signal) of the time differential of the spatial differential of the phase difference determined for that location.

The first polarisation state and the second polarisation state may be different polarisation states. The first polarisation state and second polarisation state may be orthogonal, e.g. the first polarisation state may correspond to a vertical polarisation state, and the second polarisation state may correspond to a horizontal polarisation state.

The local oscillator signal or the scattered signal may be split into the first and second polarisation states using a polarising beam splitter. Alternatively, in some embodiments, the scattered signal may be split into the first and second polarisation states using a polarising beam splitter.

The detector stage may include a first detector and a second detector which are configured to detect a respective polarisation state. For example, where the local oscillator is split into the first and second polarisation states, the first detector may be configured to detect interference of the scattered signal with the first polarisation state of the local oscillator signal; and the second detector may be configured to detect interference of the scattered signal with the second polarisation state of the local oscillator signal.

Where the local oscillator signal is split into the two polarisation states, the first complex carrier signal associated with a given polarisation state may be generated based on an interference of the scattered signal and that polarisation state of the local oscillator signal. On the other hand, where the scattered signal is split into the two polarisation states, the first complex carrier signal associated with a given polarisation state may be generated based on an interference of that polarisation state of the scattered signal and the local oscillator signal.

Following the processing steps of the method of the third aspect of the invention, a third complex carrier signal associated with the first polarisation state and a third complex carrier signal associated with the second polarisation state are generated. Summing the third complex carrier signals associated with each polarisation state may correspond to "polarisation stacking" of the third complex carrier signals.

In some cases, there may be two or more polarisation states, in which case a respective third complex carrier signal may be generated for each of the two or more polarisation states. Then, all of the third complex carrier signals may be summed together to generate the fourth complex carrier signal.

The spatial stacking of the second aspect of the invention and the polarisation stacking of the third aspect of the invention may be combined, in order to further enhance SNR. Thus, in one embodiment of the third aspect, the scattered signal may include a set of scattered signals, wherein each scattered signal in the set of scattered signals was scattered at a respective location along the optical path; the steps for generating a fourth complex carrier signal may be performed for each of the scattered signals to generate a respective fourth complex carrier signal associated with each of the scattered signals; the determining step may include summing two or more of the respective fourth complex carrier signals to generate a fifth complex carrier signal, and determining, based on the fifth complex carrier signal, a value representative of the time differential of the spatial differential of the phase difference for one or more of the respective locations along the optical path.

Thus, each of the respective fourth complex carrier signals is generated by polarisation stacking, i.e. by summing the third complex carrier signals associated with each of the polarisation states for a given scattered signal. Then, summing two or more of the respective fourth complex carrier signals corresponds to spatial stacking of the signals, as the fourth complex carrier signals correspond to different locations along the optical path.

Summing the two or more respective fourth complex carrier signals may be performed in an analogous manner to the step of summing two or more of the third complex carrier signals described in relation to the second aspect of the invention.

Alternatively, a different vector stacking method compared to that implemented in the second and third aspects of the invention may be employed to improve SNR prior to determining value representative of the spatial differential of the phase, e.g. prior to applying a rectangular to polar coordinate transform. Thus, according to a fourth aspect of the invention, there is provided a signal processing method for a distributed acoustic sensing system, the method comprising: transmitting a pulsed test signal along an optical path; receiving, at a detector stage, a set of scattered signals, wherein each scattered signal in the set of scattered signals was scattered at a respective location along the optical path; receiving, at the detector stage, a local oscillator signal; and for each of two or more of the scattered signals in the set of scattered signals: generating, based on an interference of that scattered signal and the local oscillator signal, a first complex carrier signal associated with that scattered signal, the first complex carrier signal being modulated by a phase difference between the local oscillator signal and that scattered signal; processing the first complex carrier signal to generate a second complex carrier signal associated with that scattered signal, the second complex carrier signal being modulated by a spatial differential of the phase difference, the spatial differential being taken along a length of the optical path; representing the second complex carrier signal associated with that scattered signal as a phasor; determining a reference phasor associated with that scattered signal, based on a time average of the phasor; rotating the phasor by an angle corresponding to a difference between a common reference phasor and the reference phasor associated with that scattered signal; wherein the common reference phasor is determined based on a sum of the reference phasors determined for the two or more scattered signals; the method further comprising: summing the rotated phasors corresponding to the two or more of the scattered signals to generate a third complex carrier signal; and determining, based on the third complex carrier signal, a value representative of the spatial differential of the phase difference for one or more of the respective locations along the optical path.

The method of the fourth aspect of the invention is based on the method of the first aspect of the invention, and any features described above in relation to the first and second aspects of the invention may be shared with the second aspect of the invention. Additionally, the method of the fourth aspect of the invention includes, following generation of the second complex carrier signal, additional processing in order to improve the SNR. In particular, rotating the phasors for each of the scattered signals, and then summing the rotated phasors together results in a third complex carrier signal having an increased amplitude and thus having an improved SNR, which may facilitate determining a value of the spatial differential of the phase difference for a location along the optical path.

Importantly, the method of the fourth aspect may result in an improved SNR prior to the determining of a value representative of the spatial differential of the phase difference, e.g. prior to applying a rectangular to polar coordinate transform to the fourth complex carrier signal. As a result, it may be possible to improve accuracy of measurements for longer optical paths and higher spatial resolutions.

The steps of transmitting the pulsed test signal, receiving the scattered signals, receiving the local oscillator signal, generating the first complex carrier signal and processing the first complex carrier signal to generate a second complex carrier signal may be performed as described above in relation to the first aspect of the invention.

The set of scattered signals may include two or more scattered signals. The scattered signals may be received consecutively in time at the detector stage. As mentioned above, the location at which a scattered signal was scattered may be determined based on a time of receipt of the scattered signal at the detector stage.

Each of the two or more scattered signals in the set of scattered signals may be scattered at a respective location along the optical path, wherein each of the respective locations is located within a chosen length of the optical path. The chosen length of the optical path may correspond to a correlation length of the acoustic modulation along the optical path. This may serve to ensure that the two or more scattered signals are all correlated, which may result in the corresponding phasors being correlated. As a result, a sum of the two or more rotated phasors may be constructive.

The first complex carrier signal may be represented as a phasor (or vector) using any suitable method. The phasor may have an amplitude that is proportional to a scatter amplitude at a given location and an angle determined by the instantaneous sum of the scatter sites illuminated. An angular frequency of the phasor may be related to an acoustic modulation at a corresponding location along the optical path. The angle of the phasor may be substantially random, and rotate from pulse to pulse based on acoustic modulation of the scatter phase at the corresponding location. For an unperturbed location (e.g. where there is no strain or acoustic modulation), the angle and amplitude of the phasor may only vary by an amount corresponding to inherent noise within the measurement. It can be shown that the distribution of the phase length and angle is equivalent to a phasor with a Gaussian noise cloud distribution.

The reference phasor may be determined by performing a low pass time average of a time evolution of the phasor (e.g. over multiple pulses of the pulsed test signal), e.g. by applying a low pass average filter. This may be achieved by receiving the scattered pulse signal for the corresponding location along the optical path for multiple pulses of the pulsed test signal, and performing a low pass average of the time evolution of the phasor. A cut-off frequency of the low pass time average may be set such that it is lower than a frequency of a minimum acoustic modulation frequency of interest. This may yield a reference phasor that is centred in the noise distribution, and which ensures that acoustic modulation frequencies of interest may be detected.

For a perturbed location (e.g. where there is a strain or acoustic modulation), the amplitude and angle of the phasor may be modulated symmetrically about the reference phasor. The phasor may be referred to as an instantaneous phasor, in contrast to the reference phasor which corresponds to a time average of the phasor over time.

The steps performed for each of the two or more scattered signals may result in a set of reference phasors, where each reference phasor is associated with a respective scattered signal, and hence with a respective location along the optical path.

The common reference phasor is determined by summing together all of the reference phasors that are determined for each of the two or more scattered signals that are to be summed. Thus, the common reference phasor is the same for all of the two or more scattered signals within the sum.

The rotating of the phasor may be performed by vector multiplication, to achieve a rotation of the phasor by an angle equivalent to the angle difference between the common reference phasor and the reference phasor. Rotating the phasors may result in phasors corresponding to adjacent locations along the optical path being substantially aligned, so that they can be constructively summed. In particular, rotated phasors corresponding to locations that are within a length defined by the extent of the acoustic modulation may be substantially aligned.

The steps performed for each of the two or more scattered signals may result in a set of two or more rotated phasors, where each rotated phasor corresponds to one of the scattered signals (and hence location along the optical path). The step of summing the rotated phasors may then include summing the two or more rotated phasors, i.e. the rotated phasors determined for each of the two or more scattered signals.

The two or more scattered signals may correspond to scattered signals that were scattered at adjacent (or neighbouring) locations along the optical path. This may facilitate obtaining a constructive sum of the two or more third complex carrier signals, which may improve the SNR. For example, the set of two or more rotated phasors may include eight rotated phasors, each of the eight rotated phasors corresponding to scattered signals that were scattered from adjacent locations. The number of rotated phasors that are summed together may be selected based on a desired spatial resolution of the measurement, as well as the correlation length of the measurement.

The step of summing the two or more rotated phasors may be referred to as 'spatial vector stacking', as it involves summing phasors that correspond to different locations along the optical path.

The number of scattered signals for which the sum is performed (i.e. the number of the two or more scattered signals) may be determined based on a correlation length of acoustic modulation along the optical path. The scatter phase and amplitude of a second complex carrier over a given length of optical path may exhibit a certain correlation (or coherence) length due to the averaging nature of the sum of scatter sites enveloped by the optical pulse. This correlation length may be related to a length of a pulse in the pulsed test signal. For example, the correlation length may correspond to a half-length of a pulse in the pulsed test signal. However the inventors have found that the phasor angle and amplitude of the third complex carrier may exhibit a correlation length that exceeds that exhibited by the second complex carrier, as defined by the pulse and is limited only by the extent of the acoustic modulation and on the chosen spatial gauge length. A length may then be chosen such that a sum of two or more of the third complex carrier signals remains constructive.

The third complex carrier signal may be a complex carrier signal that is representative of a phasor that results from the sum of the two or more rotated phasors.

The one or more respective locations for which the value representative of the spatial differential of the phase difference is determined based on the third complex carrier signal may correspond to scattering locations associated with the two or more scattered signals. For example, the one or more locations may correspond to a portion (length) of the optical path that includes the scattering locations associated with the two or more scattered signals.

The step of determining a value representative of the spatial differential of the phase difference for one or more of the respective locations along the optical path may include applying a rectangular to polar coordinate transform to the third complex carrier signal. Applying the rectangular to polar coordinate transform to the fourth complex carrier signal may include passing the fourth complex carrier signal through a digital down conversion stage.

A similar vector stacking method to that described above in relation to the fourth aspect for improving SNR may be used for stacking phasors corresponding to different polarisation states, e.g. in cases where a polarisation diverse detection system is used. In other words, instead of stacking phasors corresponding to different spatial locations, phasors corresponding to different polarisation states may be stacked (i.e. summed). Thus, according to a fifth aspect of the invention, there is provided a signal processing method for a distributed acoustic sensing system, the method comprising: transmitting, a pulsed test signal along an optical path; receiving, at a detector stage, a scattered signal that was scattered at a location along the optical path; receiving, at the detector stage, a local oscillator signal; splitting the local oscillator signal or the scattered signal into a first polarisation state and a second polarisation state; for each of the first polarisation state and second polarisation state: generating, based on an interference of the scattered signal and the local oscillator signal a first complex carrier signal associated with that polarisation state, the first complex carrier signal being modulated by a phase difference between the local oscillator signal and the scattered signal; processing the first complex carrier signal to generate a second complex carrier signal associated with that polarisation state, the second complex carrier signal being modulated by a spatial differential of the phase difference, the spatial differential being taken along a length of the optical path; representing the second complex carrier signal associated with that polarisation state as a phasor; determining a reference phasor associated with that polarisation state based on a time average of the phasor; rotating the phasor by an angle corresponding to a difference between a common reference phasor and the reference phasor associated with that polarisation state; wherein the common reference phasor is determined based on a sum of the reference phasor associated with the first polarisation state and the reference phasor associated with the second polarisation state; the method further comprising: summing the rotated phasors associated with the first polarisation state and the second polarisation state to generate a third complex carrier signal; and determining, based on the third complex carrier signal, a value representative of the spatial differential of the phase difference for the location along the optical path.

The method of the fifth aspect of the invention is based on the method of the first aspect of the invention, and any features described above in relation to the first aspect of the invention may be shared with the fifth aspect of the invention. The steps of transmitting the pulsed test signal, receiving the scattered signals, receiving the local oscillator signal, generating the first complex carrier signal and processing the first complex carrier signal to generate a second complex carrier signal may be performed as described above in relation to the first aspect of the invention.

The step of processing the second complex carrier signal to generate a third complex carrier signal may be performed as described above in relation to the second aspect of the invention. Features relating to the generation of the third complex carrier signal, and properties of the third complex carrier signal, discussed above in relation to the second aspect of the invention may be shared with the fifth aspect of the invention.

Rotating the phasor associated with each polarisation state in the manner described may result in the phasors being aligned, such that they can be constructively summed together. Accordingly, the third complex carrier signal that results from the sum of the rotated phasors for each of the polarisation states may have an improved SNR. Summing of the rotated phasors to generate the third complex carrier signal may correspond to "polarisation stacking" of signals, as it involves performing a sum over different polarisation states.

Importantly, the method of the fifth aspect may result in an improved SNR prior to the determining of a value representative of the spatial differential of the phase difference, e.g. prior to applying a rectangular to polar coordinate transform to the third complex carrier signal. As a result, it may be possible to improve accuracy of measurements for longer optical paths and higher spatial resolutions.

The step of determining a value representative of the spatial differential of the phase difference may be performed as described above in relation to the second aspect of the invention. In particular, this step may include applying a rectangular to polar coordinate transform to the fourth complex carrier signal. Applying the rectangular to polar coordinate transform to the fourth complex carrier signal may include passing the fourth complex carrier signal through a digital down conversion stage. The step of determining a value representative of the spatial differential for the location may include performing a sum (or integral) over time (i.e. over multiple pulses of the pulsed test signal) of time differential of the spatial differential of the phase difference.

The first polarisation state and second polarisation state may be as described above in relation to the third aspect of the invention. Features relating to the generation of the polarisation states, the detector stage, interference of the local oscillator signal and scattered signal, and generation of the first complex carrier signal may be as described above in relation to the third aspect of the invention.

The steps performed for each of the polarisation states may result in a set of rotated phasors, where each rotated phasor corresponds to a respective polarisation state. Each rotated phasor may also be associated with a particular location along the optical path, i.e. the location where the scattered signal was scattered.

The spatial stacking of the fourth aspect of the invention and the polarisation stacking of the fifth aspect of the invention may be combined, in order to further enhance SNR. Thus, in one embodiment of the fifth aspect, the scattered signal includes a set of scattered signals, wherein each scattered signal in the set of scattered signals was scattered at a respective location along the optical path; the steps for generating a third complex carrier signal are performed for each of the scattered signals to generate a respective third complex carrier signal associated with each of the scattered signals; the determining step includes summing two or more of the respective third complex carrier signals to generate a fourth complex carrier signal, and determining, based on the fourth complex carrier signal, a value representative of the spatial differential of the phase difference for one or more of the respective locations along the optical path.

Thus, each of the respective third complex carrier signals is generated by polarisation stacking, i.e. by summing the rotated phasors associated with each of the polarisation states for a given scattered signal. Then, summing two or more of the respective third complex carrier signals corresponds to spatial stacking of the signals, as the third complex carrier signals correspond to different locations along the optical path.

Summing the two or more respective third complex carrier signals may be performed in an analogous manner to the step of summing two or more of the third complex carrier signals described in relation to the second aspect of the invention.

In such an embodiment, the common reference phasor may be determined based on a sum of the rotated phasors associated with the first polarisation state and the second polarisation state over two or more of the scattered signals. The two or more scattered signals for which the common reference phasor is determined may correspond to the two or more third complex carrier signals that are summed to generate the fourth complex carrier signal.

More generally, the inventors have realised that the vector stacking method described in the fourth aspect of the invention may be applied in order to improve the SNR of phase modulated carrier signals. Accordingly, vector stacking may be performed directly with the first complex carrier signal discussed above, in order to improve the SNR of the first complex carrier signal. This may enable phase information to be extracted more accurately from the first complex carrier signal. So, a sixth aspect of the invention provides a signal processing method for a distributed acoustic sensing system, the method comprising: transmitting a pulsed test signal along an optical path; receiving, at a detector stage, a set of scattered signals, wherein each scattered signal in the set of scattered signals was scattered at a respective location along the optical path; receiving, at the detector stage, a local oscillator signal; and for each of two or more of the scattered signals in the set of scattered signals: generating, based on an interference of that scattered signal and the local oscillator signal, a first complex carrier signal associated with that scattered signal, the first complex carrier signal being modulated by a phase difference between the local oscillator signal and that scattered signal; representing the first complex carrier signal associated with that scattered signal as a phasor; determining a reference phasor associated with that scattered signal, based on a time average of the phasor; rotating the phasor by an angle corresponding to a difference between a common reference phasor and the reference phasor associated with that scattered signal; wherein the common reference phasor is determined based on a sum of the reference phasors determined for the two or more scattered signals; the method further comprising: summing the rotated phasors to generate a second complex carrier signal.

The principles underlying the method of the sixth aspect of the invention are the same as those discussed above in relation to the fourth aspect of the invention. In particular, summing the rotated phasors together may result in a constructive addition of the two or more rotated vectors. This may provide a carrier signal with increased amplitude, which may therefore have improved SNR.

The second complex carrier signal may be a complex carrier signal that is representative of a phasor that results from the sum of the two or more rotated phasors.

The steps of determining a reference phasor, rotating the phasor and determining the common reference phasor may be performed in a manner analogous to that described above in relation to the fourth aspect of the invention.

The two or more scattered signals may be as described above in relation to the fourth aspect of the invention.

Once the second complex carrier signal has been obtained, further processing steps may be performed on the second complex carrier signal in order to determine information relating to an acoustic environment of the optical path.

The methods of the first, second, third, fourth, fifth and sixth aspects of the invention may be implemented using a distributed acoustic sensing system. Therefore, a seventh aspect of the invention provides a distributed acoustic sensing system comprising: a pulse generator configured to transmit a pulsed test signal along an optical path; a detector stage configured to receive a test signal that was scattered along an optical path and a local oscillator signal; and a controller configured to perform a method according to one of the previous aspects of the invention.

Features described above in relation to any of the previous aspects of the invention may be shared with the system of the seventh aspect of the invention. In particular, features described above relating to components of the distributed acoustic system may be included in the system of the seventh aspect of the invention. Additionally, the system of the seventh aspect of the invention may include features set out in the detailed description, e.g. in relation to FIG. 1.

The controller may be a computing device or processor that is configured to control the DAS and perform the required processing steps. For example, the controller may have software installed thereon for performing the steps of the methods described above.

In some embodiments, the distributed acoustic sensing system may be a heterodyne detection system, e.g. a frequency of the test signal may be shifted relative to a frequency of the local oscillator signal.

The distributed acoustic sensing system may be an optical time domain reflectometer.

In some embodiments, the distributed acoustic sensing system may be a polarisation diverse detection system. For example, the system may be configured to measure different polarisation states, e.g. vertical and horizontal polarisation. In such a case, the processing stage of the system may be configured to perform steps of the methods described above for each of the polarisation states measured by the system.

BRIEF DESCRIPTION OF THE DRAWINGS

An embodiment of the invention is discussed below in more detail with reference to the accompanying drawings, in which.

DETAILED DESCRIPTION; FURTHER OPTIONS AND PREFERENCES

Distributed Acoustic Sensing System—Optical Time Domain Reflectometer

Figure 1:
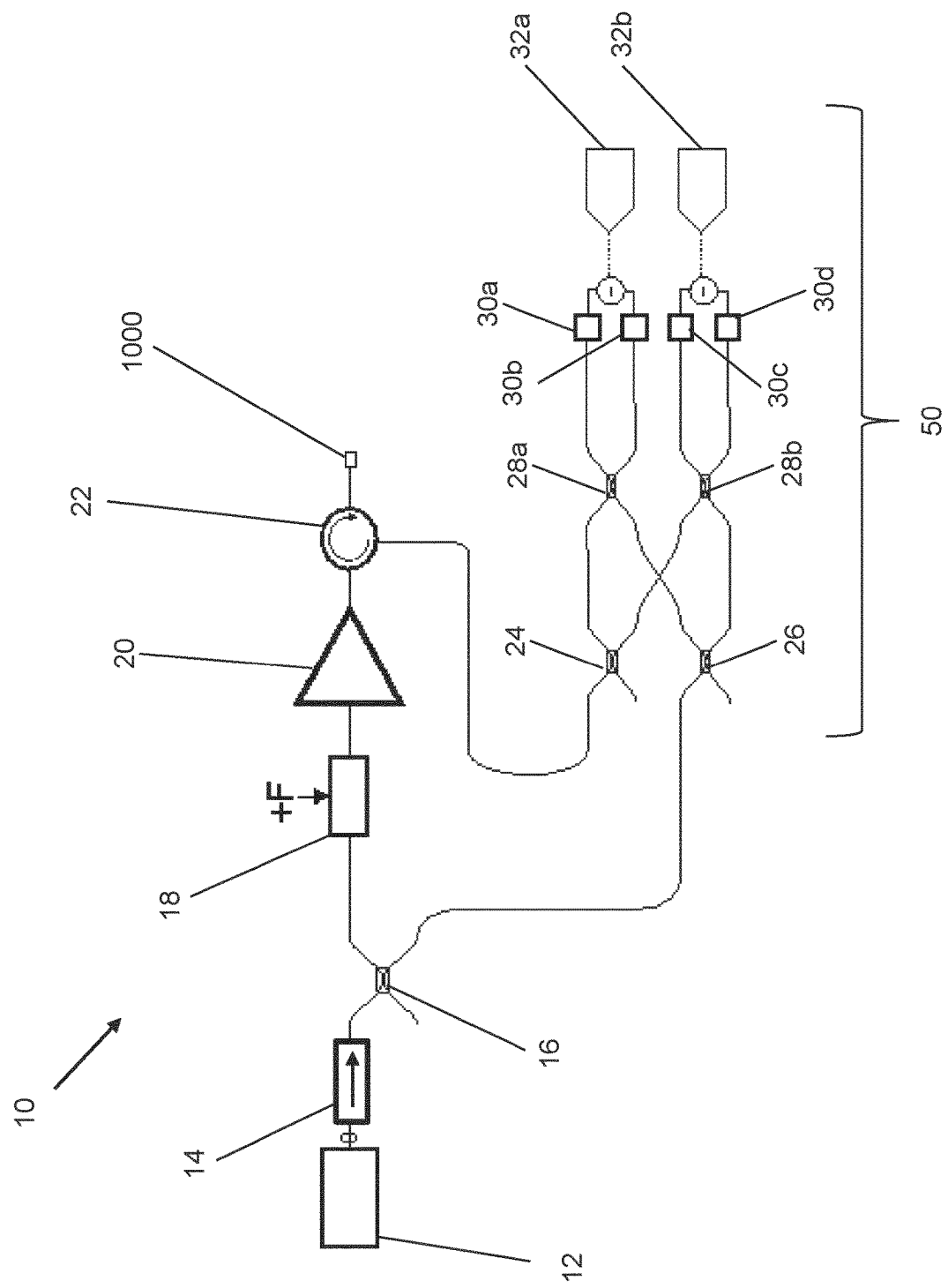
FIG. 1 is a diagram of a conventional local oscillator based optical time domain reflectometer system.

FIG. 1 shows a diagram of a distributed acoustic sensing system in the form of a local oscillator based optical time domain reflectometer (OTDR) system 10. The system 10 is arranged to interrogate an optical path, in particular an optical fiber 1000, which may be of any desirable length for a given purpose.

The system 10 comprises a light source which produces coherent light, which is given here as a laser 12, and is used in continuous wave (CW) operation. The light produced by the laser 12 is directed into an optical isolator 14 to ensure that light is not passed back to the laser 12. After passing through the isolator 14, the light is split into two paths by an optical coupler 16 or beam splitter. The first path, from which light is directed into the fiber 1000 is known as the launch path. The second path, from which light is passed directly to a detection system 50 (discussed below), is known as the local oscillator path. The light is split between the two paths by the optical coupler 16 such that 90% of the incoming light is directed into the launch path, and 10% of the incoming light is directed into the local oscillator path. Of course, the ratio of incoming light directed into each path may be chosen by the operator depending on the nature of the operation for which the OTDR system 10 is used.

The laser light which is directed into the launch path then passes through a pulse generator, such as an acousto-optic modulator (AOM) 18. The AOM 18 is a device which can simultaneously generate an optical pulse as well as upshift or downshift the frequency of light by an amount equal to the radiofrequency which drives the AOM 18. This is shown in FIG. 1 by the +F frequency being introduced to the AOM 18. This frequency, F, may be known as the intermediate frequency or the difference frequency. In this way, the AOM 18 is able to generate a pulsed test signal which may be between 5 ns and 100 ns in duration, but not limited to this range. Of course, any preferred method of generating a pulse of light may be used, such as an electro-optic modulator (EOM). The pulsed test signal may also be referred to herein as a launch pulse.

The pulse of light is then amplified using an optical amplifier 20. The amplified light pulse is introduced to the optical fiber 1000 via an optical circulator 22, which has three ports. The amplified light pulse enters the circulator 22 through a first port, where it is passed to a second port in order to enter the optical fiber 1000. As the pulse of light passes through the fiber 1000, a fraction of the light is backscattered from the fiber 1000 by Rayleigh scattering and a further fraction captured and guided back towards the circulator 22. The scattered light, which may be referred to herein as a scattered signal, enters the circulator 22 at the second port, and leaves the circulator 22 to enter a detection stage 50 via a third port.

The detection stage 50 has two inputs. The first input is the scattered laser light from the third port of the circulator 22. The second input is the laser light taken directly from the local oscillator path mentioned above. In a first part of the detection stage 50, the scattered laser light is divided into two paths, for example using a polarising beam splitter (PBS) 24. The PBS 24 splits the scattered light into a horizontally polarised state and a vertically polarised state. The PBS 24 is used as the polarisation of the pulse of light directed through the launch path and also of the scattered light will evolve as a function of distance as it passes through the optical fiber. The PBS 24 therefore ensures polarisation diverse detection, such that a signal is always detected for any polarisation state of light scattered by the optical fiber 1000. The local oscillator (LO) light, which is highly polarised, is also split equally between two paths using a polarisation maintaining optical coupler 26. In other embodiments, the LO signal may be split into two polarisation states in preference to the scattered signal as described.

The scattered light is then mixed with the LO light in each of the horizontal and vertical states at two optical couplers $$I_{Det} = \frac{1}{4}|E_s|^2 + \frac{1}{4}|E_{LO}|^2 + \frac{1}{4}|E_s||E_{LO}|\left[e^{i(\phi_{sn}(t)-\phi_{LOn}(t)-(\omega_s-\omega_{LO})t)} + e^{-i\left(\phi_{sn}(t)-\phi_{LOn}(t)-(\omega_{LO})t\right)+e^{i(\phi_{sn}(t)+\phi_{sn}(t)+\phi_{LOn}(t)-(\omega_s-\omega_{LO})t)}} + e^{-i(\phi_{sn}(t)+\phi_{LOn}(t)-(\omega_s+\omega_{LO})t)}\right]$$

28a, 28b. The light from each output of the optical couplers 28a, 28b is then allowed to interfere on a square law detector 30a, 30b, 30c, 30d. The difference of the signal from each detector pair 30a and 30b, 30c and 30d is then taken and measured at an analog-digital-converter 32a, 32b.

The system 10 described above makes use of a heterodyne sensing approach, wherein the frequency of the local oscillator and of the launch pulse are shifted relative to one another by the AOM 18. The difference in these two frequencies should be larger than the bandwidth required to represent the scattering without allowing crosstalk between the carrier and the DC terms which are also generated (see below), allowing the phase and amplitude information of the scattering to be recovered using a real carrier. Another method employs a complex carrier detection stage, replicating the polarisation diverse detection stage for two copies of the local oscillator shifted by 90 degrees relative to each other. This allows detection via a complex carrier, allowing either the positive sidelobe or the negative sidelobe of the resulting interference signal to be recovered independently. This allows homodyne operation whereby the local oscillator signal and launch pulse operate at the same optical frequency.

Figure 2:
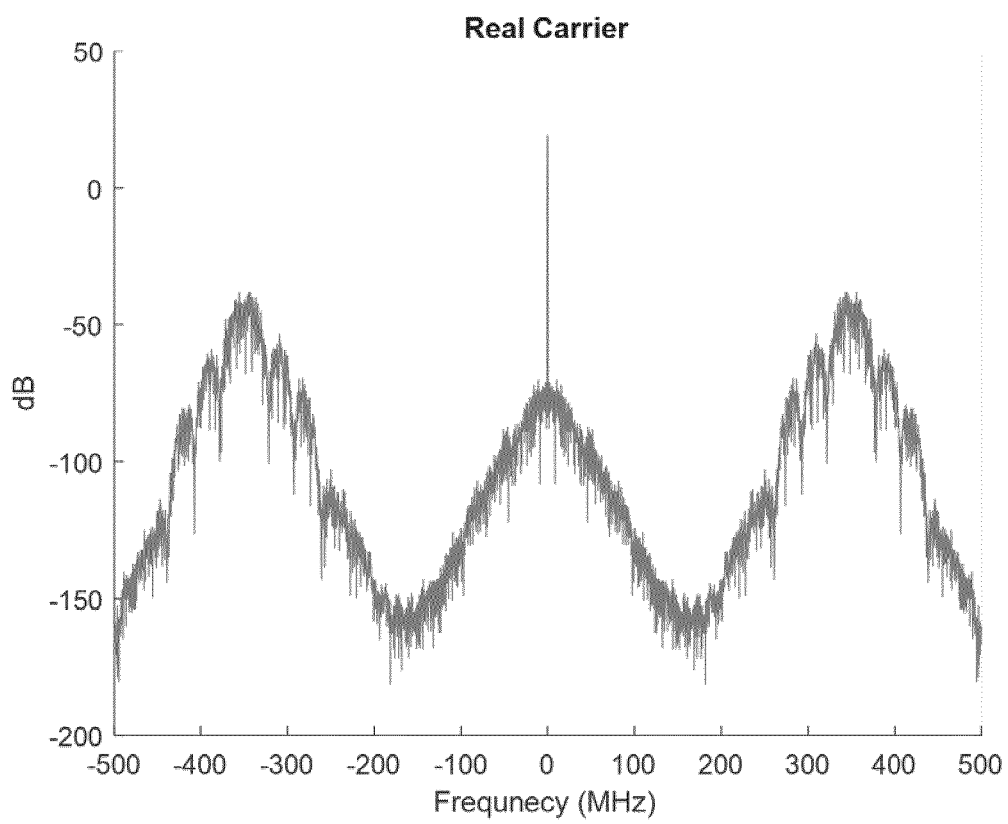
FIG. 2 shows the frequency domain of a simulated detector trace for a local oscillator based optical time domain reflectometer system as shown in FIG. 1.

FIG. 2 is a simulated detector trace showing the detection spectrum for a local oscillator based optical time domain reflectometer system implemented with heterodyne coherent detected, as discussed above with respect to FIG. 1. In the depicted example, the difference frequency between the local oscillator and the launch path pulse is 350 MHz. A treatment of the interference of two waves is given below, and the resulting terms are distinguishable in the simulated detector trace of FIG. 2. Note that for illustrative purposes a noise contribution is not included in the spectrum of FIG. 2.

A treatment of the interference of two waves for the system shown in FIG. 1 is shown below.

$$E_S = \frac{1}{2}E_{Sn}\left(e^{i(\phi_{sn}(t)-\omega_s t)} + e^{-i(\phi_{sn}(t)-\omega_s t)}\right) \quad (1)$$

Equation (1) shows the E-field resulting from scattering within the optical fiber at a position n, with phase $\phi_{sn}$ and frequency $\omega_S$.

$$E_{LO} = \frac{1}{2}E_{LOn}\left(e^{i(\phi_{LOn}(t)-\omega_{LO}t)} + e^{-i(\phi_{LOn}(t)-\omega_{LO}t)}\right) \quad (2)$$

Equation (2) shows the E-field of the local oscillator at a position n, with phase $\phi_{LOn}$ and frequency $\omega_{LO}$.

When these two waves interfere, and are observed by a square law detector, the resulting intensity is given by equation (3), below:

$$I_{Det}=(E_S+E_{LO})\cdot(E_S+E_{LO})^* \quad (3)$$

This can be expanded and simplified to:

It can be seen that this generates a DC term related to the scattered light intensity; a DC term related to the local oscillator intensity; a negative frequency term which is centred at the difference frequency between the local oscillator and scattered light waves; and a positive frequency term which is centred at the difference frequency between the local oscillator and scattered light waves. The positive and negative frequency terms also carry information about the phase difference between the local oscillator and scattered light waves at a time, t. As a result, it is only necessary to analyse one of the positive or negative frequency terms in order to recover the phase and amplitude information, e.g. by analysing either one of the two sidebands shown in FIG. 2.

In order to recover information relating to the phase and amplitude of the signal, the signal typically undergoes digital down conversion to recover only the positive frequency term, followed by rectangular to polar coordinate transformation yielding the instantaneous phase and amplitude of the signal as a function of time. This process is equivalent to a complex multiplication and has the effect of shifting the positive frequency term, or carrier, down to DC and then filtering the signal to remove what was the DC terms and the negative frequency term. That is, the recovered signal is around the positive frequency peak shown on the right hand side of FIG. 2. At this stage since the wanted bandwidth and hence the bandwidth of the low pass filter is less than the carrier frequency, there is in effect a complex carrier at baseband, centred at 0 Hz. The in-phase and quadrature components are then passed to a rectangular-to-polar coordinate transform, yielding the instantaneous phase and amplitude of the carrier as a function of time.

Application to Digital Acoustic Sensing

A DAS system measures the acoustic field, i.e. vibrations, along a distributed length of optical fiber forming a transducer. The acoustic field is typically regarded as a modulating strain field with variations occurring in the acoustic frequency band. The DAS system can therefore measure small changes in the length of the optical fiber. Since strain acting on an optical fiber has the effect of both modulating the length of the fiber and its refractive index, the phase of scattered light is a direct measure of the optical path experienced by the probing pulse of light launched into the fiber. However, there is also the added complexity of the scattering phase at each point. It is therefore necessary to measure the change in optical phase over a given measurement gauge length to account for the effect of the scattering phase. The coherent detection method yields a result which is a cumulative phase difference acquired over the entire length of the optical fiber up to the point at which the probing pulse is backscattered towards the detector. To obtain an instantaneous phase difference rather than the cumulative phase, it is therefore necessary to calculate the difference in phase over the decided gauge length. In particular, the difference in phase between two locations, n and n+1, can be calculated by taking a spatial differential along the length of the fiber, as shown by equation 4.

$$(\phi_{s(n+1)} - \phi_{LO(n+1)}) - (\phi_{sn} - \phi_{LOn}) \quad (4)$$

As the term $(\phi_{LOn} - \phi_{LO(n+1)})$ is constant throughout the local oscillator signal, equation 4 can be used to determine the spatial differential of the scattered modulated phase along the length of the fiber. The advantage of this method that the measurement gauge length (i.e. the difference between positions n and n+1) can be decided after data acquisition. After the spatial differential is taken a series of phase data for each location is obtained which represents the optical path difference over the given spatial gauge at each location along the fiber. The phase from each location can then be unwrapped and the acoustic signal at each location can be plotted and output. This method of signal processing and phase recovery is known as 'phase domain processing'.

As noted above, a polarisation diverse detection system is used as the polarisation state of the scatter evolves with distance, and hence some locations may yield no carrier signal whatsoever as the LO and scatter field may be cross polarised. In situations like this the orthogonal channel however should yield a strong signal. It is therefore necessary to combine the response from both polarisation channels. However, since the scatter field for each polarisation state will effectively be independent, the absolute phase of the signals generated from each polarisation channel will be different and thus combination is difficult. Typically the two channels are combined in the phase domain around an average DC phase weighted by the single-to-noise ratio or power spectral density of the signal yielded for each location.

'Phase domain processing' does, however, lead to problems for DAS systems. In particular, the rectangular-to-polar (R-P) coordinate conversion step has non-linear performance in the presence of noise, and the spatial differential of phase in this method can only be performed after the R-P coordinate conversion.

As the length of the optical fiber increases, the level of the returned scatter signal reduces due to the losses of the optical fiber. The noise bandwidth of the R-P coordinate conversion is set by the pulse repetition frequency (PRF) and at some point the level of the scatter signal reduces to a level where the noise in band approaches the non-linear threshold of the R-P coordinate converter.

Typically the PRF is of the order of kHz but the target acoustic frequency range is perhaps a few 100 Hz. One known improvement is to reduce the demodulation bandwidth prior to the R-P coordinate converter, which reduces the noise in-band and hence allows operation down to lower signal-to-noise ratios than are possible without limiting the demodulation bandwidth. However, this creates an additional problem in that the phase response prior to spatial differential is a cumulative phase picked up from the fiber up to the scattering point and the effects of reduced demodulation bandwidth needs to be accounted for. If the rate of change of phase exceeds the demodulation bandwidth, either due to its frequency or its amplitude, then 'overscale' occurs, i.e. where the system can no longer track the phase and a phase jump occurs. Since the system is tracking the cumulative phase up to the point of scattering, as larger distances along the optical fiber are considered the probability that the cumulative phase will overscale increases. Over the long fiber length which is used for typical applications the probability of cumulative phase overscale is almost certain. If, however, the demodulation bandwidth is left at Nyquist (i.e. the intrinsic limit from the PRF) then the distortion components mirror from Nyquist and even in the presence of cumulative overscale a spatial differential is valid and the true spatial differential of phase can be recovered. This leads to an effective range and/or spatial resolution limitation when the phase domain processing is used.

If, however, the demodulation bandwidth is reduced, information required to create a valid spatial differential is fundamentally lost and this leads to cumulative overscale, effectively destroying downstream information required for the spatial differential to remain valid. Again, this results in a range and/or spatial resolution limitation for the phase domain processing.

The present invention aims to overcome the problems that occur with these known processing methods.

Simulation of Carrier Interference

Figure 3:
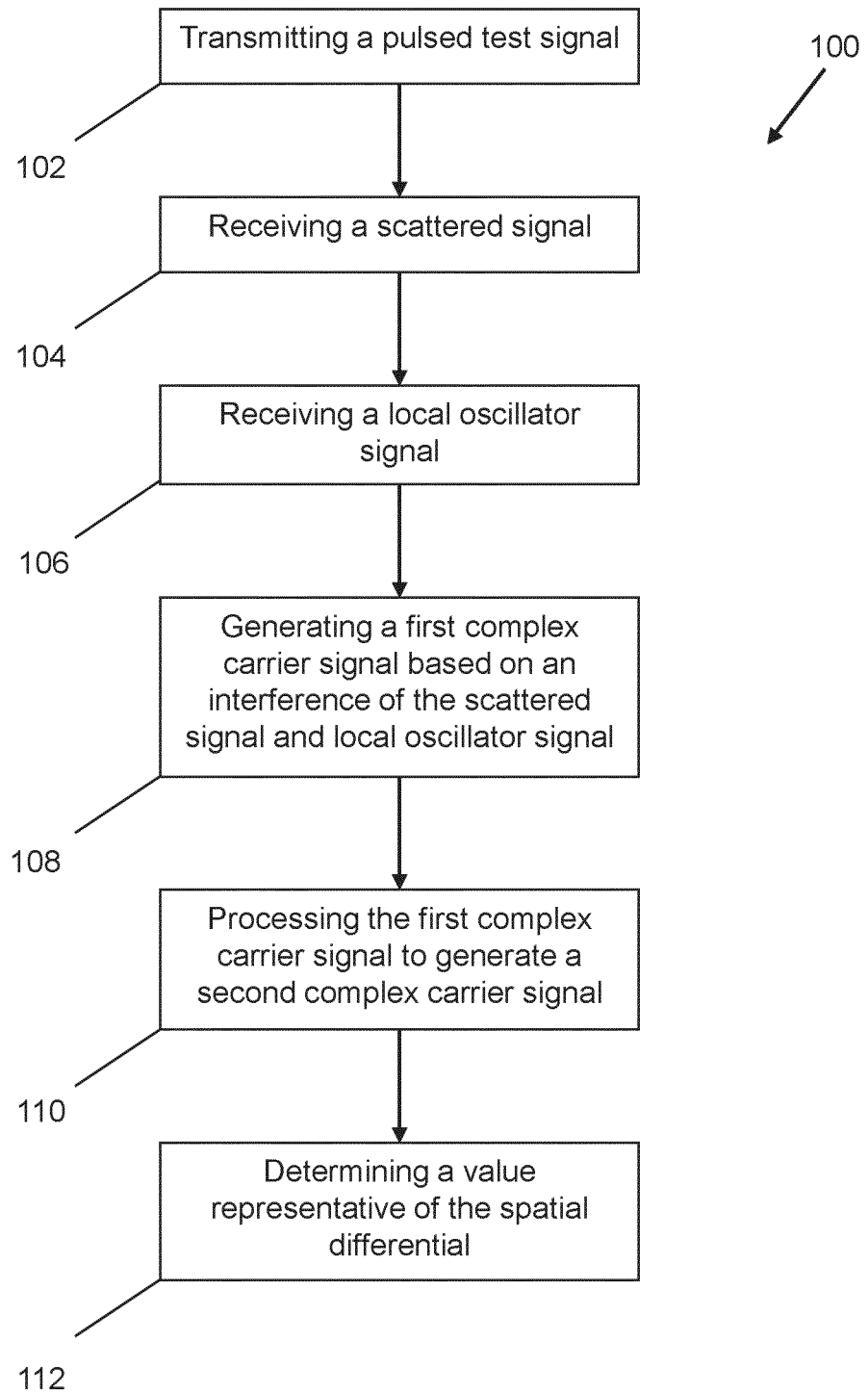
FIG. 3 is a flow chart of a signal processing method according to an embodiment of the present invention.

A flow chart of a signal processing method 100 for an optical detection stage according to an embodiment of the present invention is shown in FIG. 3. Preferably, the signal processing method 100 may make use of an optical time domain reflectometer such as that shown in FIG. 1, though the detection stage may be altered as required to work with the processing method 100 described herein. The steps of the method may be carried out by a controller of the system having appropriate software installed thereon.

In a first step 102, the method 100 comprises transmitting, with a coherent light source such as a laser, a pulsed test signal along an optical path, such as the optical fiber 1000. Preferably, the coherent light source may operate in a continuous wave mode, wherein the continuous wave may be pulsed, for example using an acousto-optic modulator (AOM) generally as described above with respect to FIG. 1. In particular, the optical path may be an optical fiber such that vibrations of the optical fiber may be detected using the method described herein.

In a second step 104, the method 100 comprises receiving a scattered signal that was scattered at a location along the optical path. Preferably, the signal may be received at a detector stage, such a detection stage of an OTDR. A local oscillator signal is also received by the detector stage at step 106. For example, the detector stage may be a detector stage 50 as described above.

When the scattered signal and the local oscillator signal are received, the method 100 comprises generating, based on interference of the scattered signal and the local oscillator signal, a first complex carrier signal that is modulated by a phase difference between the local oscillator signal and the scattered signal, at step 108. The first complex carrier signal is then processed to generate a second complex carrier signal that is modulated by a spatial differential of the phase difference, the spatial differential being taken along a chosen length of the optical path. This is shown in step 110.

For example, the first complex carrier signal may be processed to generate the second complex carrier signal by multiplying a complex conjugate of the first complex carrier signal with a delayed copy of itself (delayed by the chosen gauge delay).

In another embodiment, step 110 may comprise digitally simulating interference of the first complex carrier signal with a delayed copy of itself. Such digital simulation may comprise generating a copy of the first complex carrier signal, wherein a frequency shift is introduced between the first complex carrier signal and the copy of the first complex carrier signal, and wherein the copy of the first complex carrier signal is delayed relative to the first complex carrier signal; adding the first complex carrier signal and the copy of the first complex carrier signal together to produce a summed complex carrier signal; and multiplying the summed complex carrier signal with a complex conjugate of the summed complex carrier signal, to generate the second complex carrier signal. Preferably, this frequency shift is larger than a bandwidth required to adequately represent scattering of the test signal along the optical path whilst avoiding crosstalk with the DC baseband signal. For example, where the optical path is an optical fiber such as in an OTDR system, the scattering may be Rayleigh scattering.

Finally, the method 100 comprises, at step 112, determining, based on the second complex carrier signal, a value representative of the spatial differential of the phase difference for the location along the optical path.

In this way, the method 100 provides a carrier signal, the second complex carrier, which can passed to a rectangular to polar coordinate transform, wherein the second complex carrier signal carries not the cumulative phase of scatter as in known methods but instead carries the spatial differential of phase prior to performing R-P conversion. In this way, the problems of overscale can be avoided, which allows operation with a reduced demodulation bandwidth and an extended DAS system range. In some embodiments, prior to rectangular-to-polar coordinate transformation, the method 100 may comprise a step of passing the second complex carrier signal through a digital down conversion stage.

Figure 4:
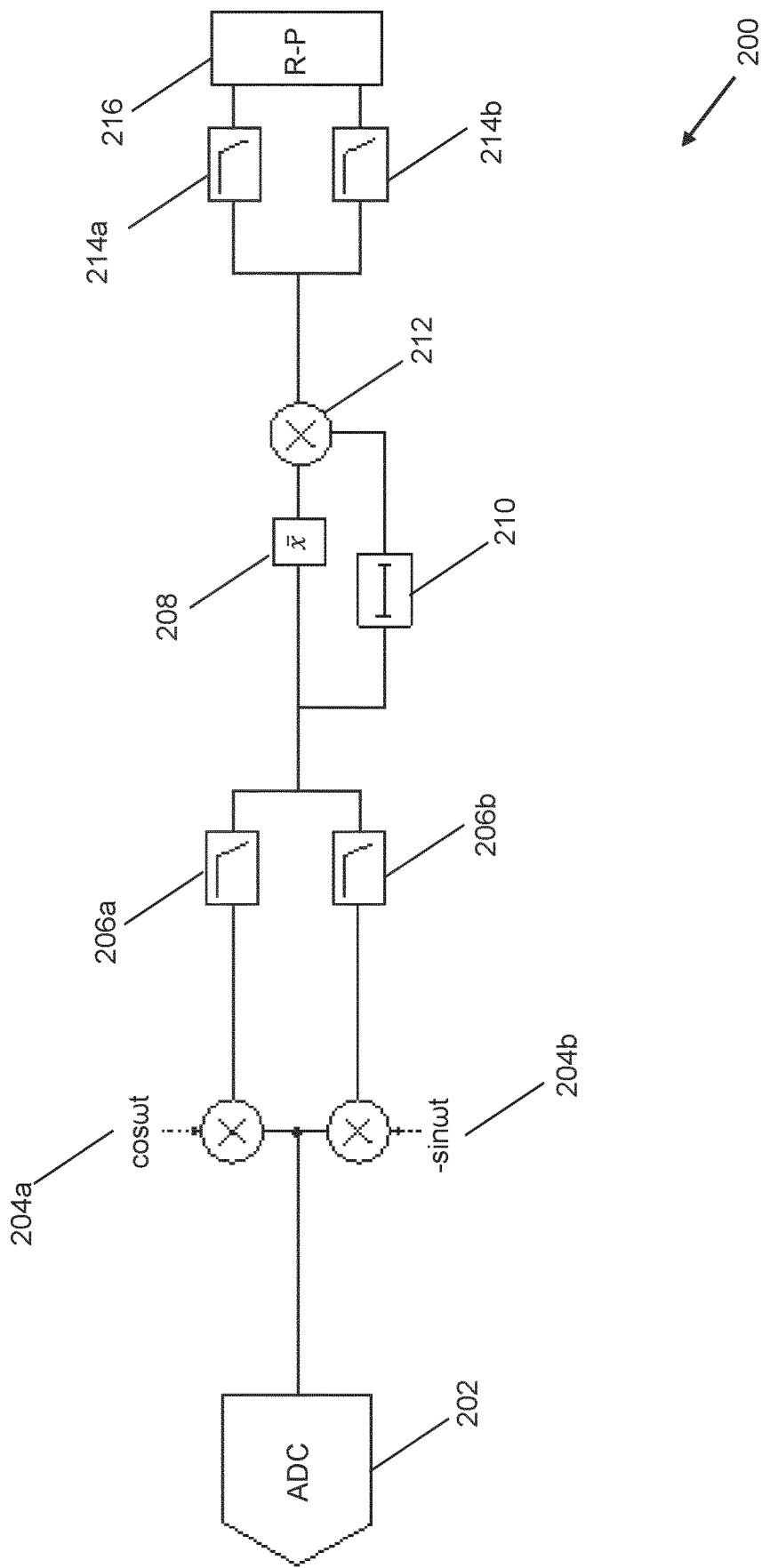
FIG. 4 is a schematic diagram of a signal processing method according to an embodiment of the present invention.

A schematic diagram showing a portion of a signal processing method 100 according to an embodiment of the present invention is shown in FIG. 4. The signal processing diagram 200 starts with a real carrier signal which is output from an analog-to-digital converter (ADC) 202. In particular, the ADC 202 may be configured to output a signal representative of the interference between a scattered signal that was scattered from a location along an optical path and a local oscillator signal, as discussed above. The output signal of the ADC 202, which is a real carrier signal, is then split into two parts, with one part being multiplied by an in-phase component (cos ωt) 204a and one part being multiplied by a quadrature component (−sin ωt) 204b. This has the effect of shifting the carrier signal down, such that the desired positive frequency term is centred at DC. Each of these parts is then passed through a lowpass filter 206a, 206b to remove the unwanted terms and the outputs of the lowpass filter 206a, 206b recombined into a complex signal. This recombined signal is the first complex carrier signal, generated in step 108 of the method 100 discussed above, which is modulated by a phase difference between the local oscillator signal and the scattered signal. At this point, the first complex carrier signal shows the cumulative phase acquired by the scattered signal.

The first complex carrier signal is again divided into two parts. A first part of first complex carrier signal undergoes complex conjugation 208, while a second part of the first complex carrier signal is delayed 210 by an amount equal to the gauge length set by an operator. This gauge length effectively decides the spatial resolution of the system, as it determines the distance between locations n and n+1 as shown in equation (4) above. The conjugated part of the first complex carrier signal and the delayed part of the first complex carrier signal are then multiplied 212, generated a second complex carrier signal that is modulated by a spatial differential of the phase difference. This is shown as step 110 of the method 100 described above. The second complex carrier signal, being generated in this way, therefore carries the spatial differential phase of the scattered signal.

The second complex carrier signal is divided into two parts, real and imaginary, with each part being sent to a lowpass filter 214a, 214b. Each filtered part is passed to a rectangular-to-polar coordinate (R-P) converter 216, from which can be derived a value representative of the spatial differential of the phase difference for the location along the optical path, as given in step 112 of the method 100 discussed above.

Figure 5:
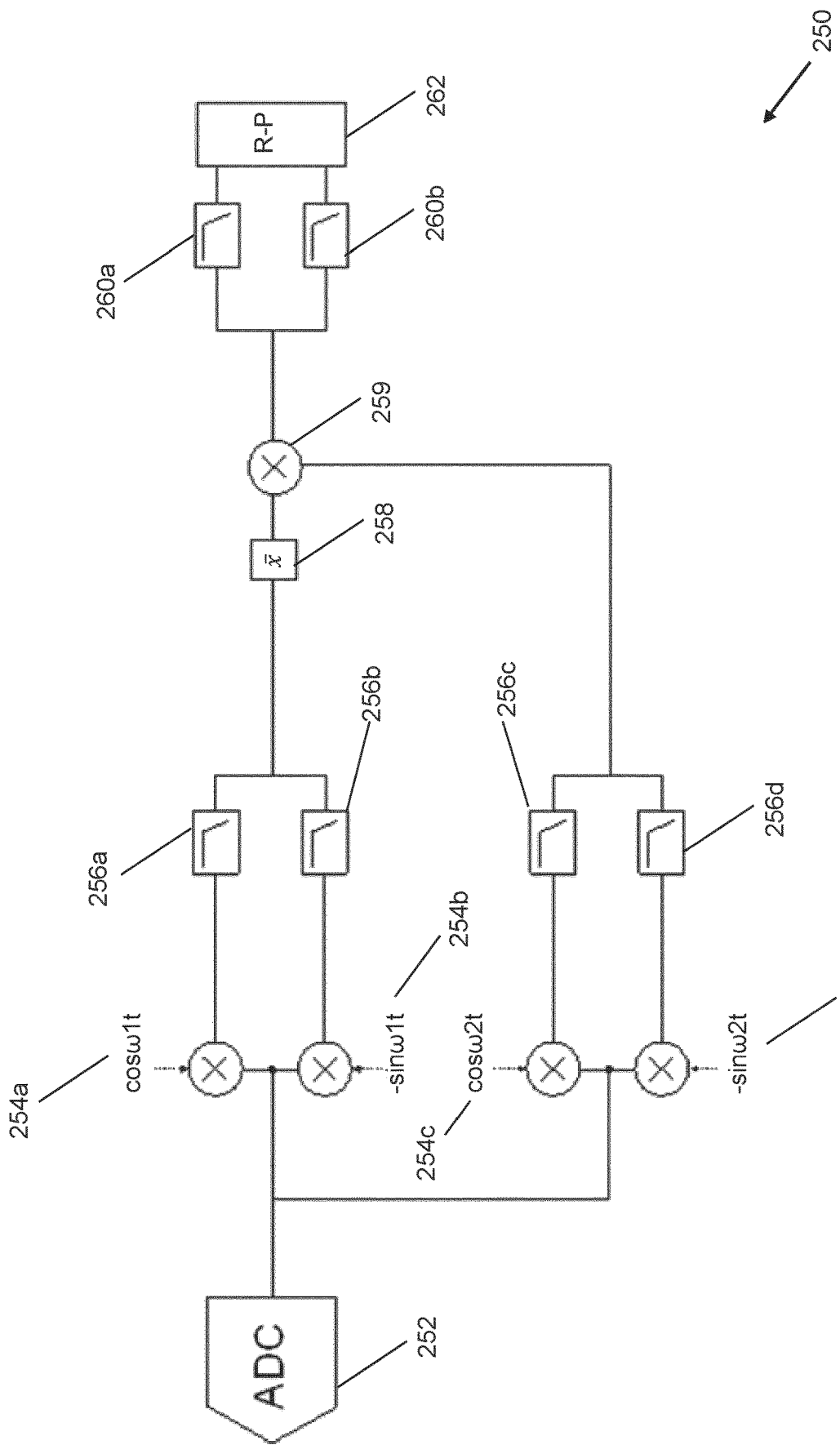
FIG. 5 is a schematic diagram of a further signal processing method according to an embodiment of the present invention.

From this spatial differential, properties of the acoustic modulation may be derived, such as displacement, strain of the fiber, velocity, etc. according to the requirements of the system user. A schematic diagram showing a portion of a signal processing method according to another embodiment of the present invention is shown in FIG. 5. The signal processing diagram 250 starts with a real carrier signal which is output from an analog-to-digital converter (ADC) 252. In this method, the test signal includes a first test pulse and a second test pulse, wherein the second test pulse is delayed relative to the first test pulse and the first test pulse and the second test pulse have different frequencies. As a result, the ADC 252 may be configured to output a signal representative of the interference between a scattered signal that was scattered from a location along an optical path and a local oscillator signal for each of the two test pulses. The output signal of the ADC 252 is then divided such that the signal which results from each test pulse is processed separately before being multiplied together at a later stage, as will be described below. It should be noted that each test pulse may be generated from a single light source and AOM which can be operated to output a first test pulse and a second test pulse. Of course, other methods of generating a first test pulse and a second test pulse may be considered. The time delay between the first test pulse and the second test pulse sets the spatial gauge length for the present embodiment.

The output signal of the ADC 252, which is a real carrier signal, is then split between two paths. A first path processes the result of the first test pulse, and the second path processes the result of the second test pulse.

Considering the first test pulse, the output signal of the ADC, a real carrier signal, is split into two parts with one part being multiplied by an in-phase component (cos $\omega_1 t$) 254a and one part being multiplied by a quadrature component (−sin $\omega_1 t$) 254b. This has the effect of shifting the carrier signal down, such that the desired positive frequency term is centred at DC. Each of these parts is then passed through a lowpass filter 256a, 256b to remove the unwanted terms and the outputs of the lowpass filter 256a, 256b are recombined into a complex signal. This recombined signal is a first complex carrier signal for the first test pulse, similar to the first complex carrier signal generated in step 108 of the method 100 discussed above, which is modulated by a phase difference between the local oscillator signal and the scattered signal. At this point, the first complex carrier signal shows the cumulative phase acquired by the scattered signal from the first test pulse. The first complex carrier signal then undergoes complex conjugation 258.

This process is repeated for the second test pulse, though complex conjugation is not implemented. The output signal of the ADC 252 for the second test pulse is split into two parts with one part being multiplied by an in-phase component (cos $\omega_2 t$) 254c and one part being multiplied by a quadrature component (−sin $\omega_2 t$) 254d. Each of these parts is then passed through a lowpass filter 256c, 256d to remove the unwanted terms and the outputs of the lowpass filter 256c, 256d are recombined into a complex signal. This recombined signal is a first complex carrier signal for the second test pulse.

The conjugate of the first complex carrier signal for the first pulse is then multiplied 259 with the second complex carrier signal for the second pulse. This generates a second complex carrier signal that carries the spatial differential phase of the scattered signal.

In this respect, with comparison to the method described with respect to FIG. 4, there is no need to introduce a gauge delay as the gauge delay naturally results from the time delay between the first test pulse and the second test pulse.

The second complex carrier signal is divided into two parts, real and imaginary, with each part being sent to a lowpass filter 260a, 260b. Each filtered part is passed to a rectangular-to-polar coordinate (R-P) converter 262, from which can be derived a value representative of the spatial differential of the phase difference for the location along the optical path, similar to step 112 of the method 100 discussed above.

From this spatial differential, properties of the acoustic modulation may be derived, such as displacement, strain of the fiber, velocity, etc. according to the requirements of the system user.

Figure 6:
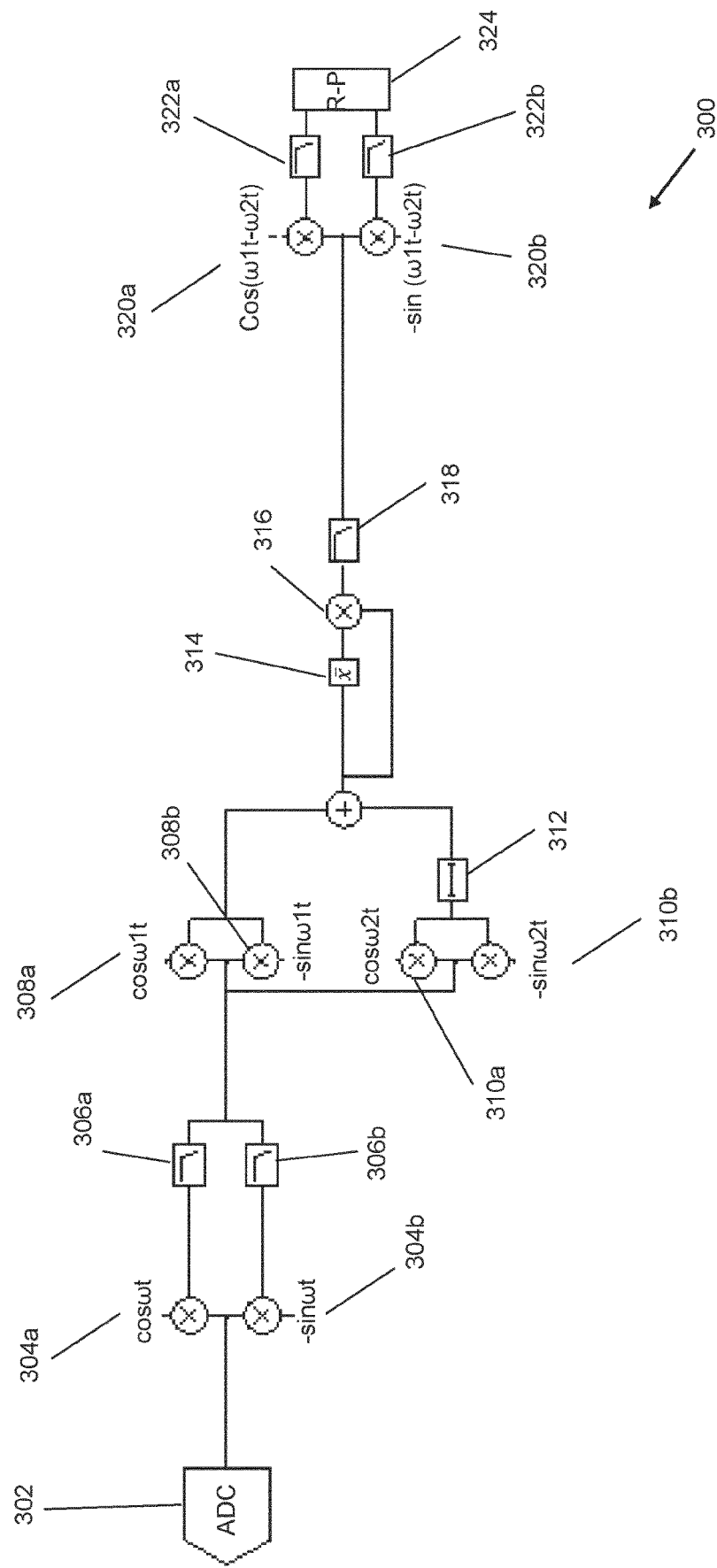
FIG. 6 is a schematic diagram of an alternative signal processing method according to an embodiment of the present invention.

A schematic diagram of another signal processing method 300 which is an embodiment of the present invention is shown in FIG. 6. The method 300 involves the digital simulation of interference of two signals, as described below.

The signal processing method 300 starts with a real carrier signal which is output from an ADC 302. In particular, the ADC 302 may be configured to output a signal representative of the interference between a scattered signal that was scattered from a location along an optical path and a local oscillator signal, as discussed above. The output signal of the ADC 302, which is a real carrier signal, is then split into two parts, with one part being multiplied by an in-phase component (cos $\omega$t) 304a and one part being multiplied by a quadrature component (−sin $\omega$t) 304b. This has the effect of shifting the carrier signal down, such that the desired positive frequency term is centred at DC. Each of these parts is then passed through a lowpass filter 306a, 306b to remove the unwanted terms and the outputs of the lowpass filter 306a, 306b recombined into a complex signal. This recombined signal is the first complex carrier signal, generated in step 108 of the method 100 discussed above, which is modulated by a phase difference between the local oscillator signal and the scattered signal. At this point, the first complex carrier signal shows the cumulative phase acquired by the scattered signal, and so may be referred to as the complex baseband cumulative carrier.

The method of generating a second complex carrier signal which is shown schematically in FIG. 6 differs from that which is shown schematically in FIG. 4. In particular, this method comprises the following steps. In a first section, the first complex carrier signal is split into four parts. A first part is multiplied by an in-phase component (cos $\omega_1$t) 308a and the second part is multiplied by a quadrature component (−sin $\omega_1$t) 304b. The first and second parts are then recombined. This gives a first complex carrier signal copy at a first intermediate frequency F1. A third part is multiplied by an in-phase component (cos $\omega_2$t) 308a and the fourth part is multiplied by a quadrature component (−sin $\omega_2$t) 304b. The third and fourth parts are then recombined to give a second complex carrier signal copy at a second intermediate frequency $F_2$. F1 and $F_2$ are arbitrary, but the difference between them, |F2−F1|, should be larger than the bandwidth required to adequately represent the Rayleigh scattering in the original pulsed signal. A gauge delay 312 is introduced to the second complex carrier copy.

The action of a square law detector is then simulated. The first and second complex carrier copies are added together to form an intermediate complex carrier signal. Two copies of this intermediate complex carrier signal are then generated, with one copy undergoing complex conjugation 314 before being multiplied with the unmodified copy, and a lowpass filter 318 applied. This yields a signal with frequency components at ±|F1+F2|, the sum frequencies which carry the sum of the cumulative phase, a DC term which is due to the interference of the F1 component of the intermediate signal with itself and the interference of the $F_2$ component of the intermediate signal with itself. There are also components at ±|F1−F2|, which are the digital carriers which now carry the spatial differential of the acoustic field, defined by the gauge length delayer 312 applied in processing.

The simulated square law detector signal then undergoes a digital down conversion stage to produce a second complex carrier signal. This digital down conversion stage comprises splitting the simulated square law detector signal into two parts, a first part is multiplied by in-phase component (cos($\omega$1t−$\omega$2t)) 320a and a second part is multiplied by a quadrature component (−sin($\omega$1t−$\omega$2t)) 320b. Each of the parts of the second complex carrier signal is then low pass filtered 322a, 322b. Each filtered part is passed to a rectangular-to-polar coordinate (R-P) converter 324, from which can be derived a value representative of the spatial differential of the phase difference for the location along the optical path, as given in step 112 of the method 100 discussed above. This R-P 324 stage can yield the spatial differential of phase directly from the carrier, with no further processing. Crucially, the digital down conversion stage can be band limited with no overscale concerns, unlike the phase domain processing method discussed previously.

As an alternative, following digital down conversion of the second complex carrier signal but prior to rectangular to polar conversion, (R-P), the two parts may be recombined into a complex signal which is itself a baseband complex carrier signal, carrying the spatial differential of phase. This baseband complex carrier signal could be used in the methods described below to improve signal-to-noise ratio.

Improving Signal-to-Noise Ratio

As has been demonstrated above, the present invention provides a signal processing method for an optical detection stage which yields a second complex carrier signal which carries the spatial differential of the phase modulation along an optical path (e.g. an optical fiber), and not the cumulative phase up to a point at which a launch pulse is scattered. By providing the second complex carrier signal in this way, it is possible to improve the signal-to-noise ratio prior to performing a rectangular-to-polar coordinate transform using methods which are described herein.

A first method requires spatially stacking carrier signals associated with each of the scattered signals. That is, signals corresponding to adjacent locations along the optical path are summed together. Following this process, the signal which is sent to the R-P coordinate transform has a much improved signal-to-noise ratio, as a spatially summed group of signals is processed by the R-P transform rather than each spatial point in isolation. A similar method can be performed to stack carrier signals which are provided by two different polarisation states, which also results in an improved signalto-noise ratio. The signal processing to enable this will be explained in more detail below.

Figure 7:
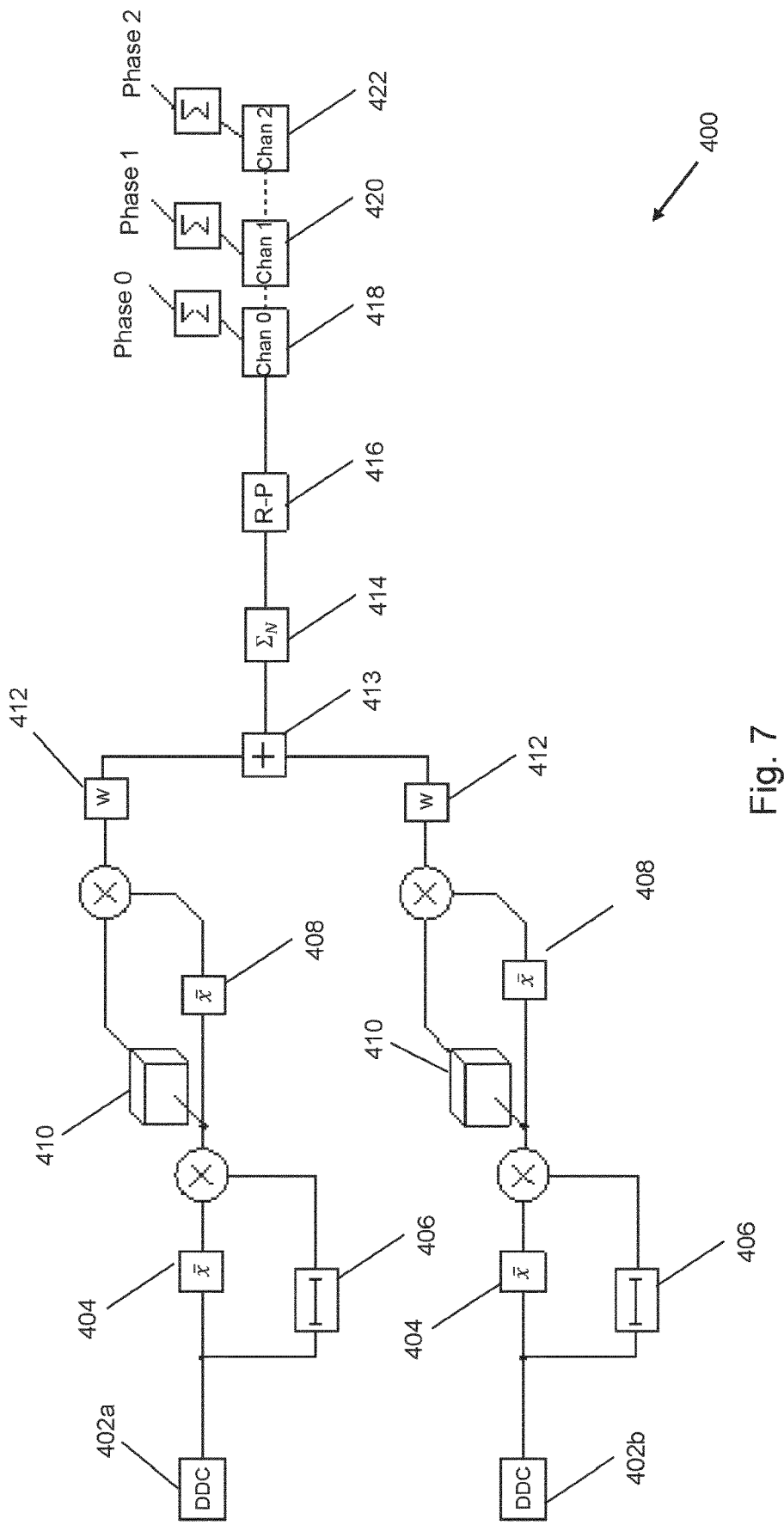
FIG. 7 is a schematic diagram of a further signal processing method according to an embodiment of the present invention.

FIG. 7 is a schematic diagram showing the steps involved in a signal processing method using vector stacking to improve the signal-to-noise ratio of a signal prior to performing an R-P coordinate transformation.

The method 400 takes as its input first complex carrier signals from digital down converters 402a, 402b. A first digital down converter 402a processes the result of a horizontal polarisation detector, and the second digital down converter 402b processes the result of a vertical polarisation detector. For example, this method may be used in an OTDR employing polarisation diverse detection as discussed above. The processing for each of the first complex carrier signals from the digital down converters 402a, 402b may be substantially the same as described above. It should be noted that the first complex carrier signals carry the cumulative phase difference acquired by a scattered signal relative to the local oscillator signal up to the point of scattering. In this way, each first complex carrier signal is linked to a spatial location along the optical path.

A first complex carrier signal is split into two parts, with a first part being subject to complex conjugation 404, and a gauge delay 406 is applied to a second part. The two parts of the first complex carrier signal are then multiplied to yield a second complex carrier signal. The second complex carrier signal generation in this way is modulated by a spatial differential of a phase difference in substantially the same manner as described above with respect to FIGS. 3-6.

A ping delay 410 is introduced to a copy of the second complex carrier signal, while another copy of the second complex carrier signal undergoes complex conjugation 408. The ping delay 410 introduces a delay equal to the time difference between successive pulses of the original pulsed test signal (or launch pulse) which is introduced to the optical path, as described above for example with respect to FIG. 1. By multiplying these two signals together, a third complex carrier signal is obtained, which is modulated by a time differential of the spatial differential of the phase difference, wherein the time differential is over a time period between successive pulses of the test signal, due to the imposed ping delay 410.

Alternatively, in order to obtain the third complex carrier signal, interference between the second complex carrier signal and a copy of the second complex carrier signal that is delayed by a time period between successive pulses of the pulsed test signal may be digitally simulated. Such digital simulation of interference may be similar to the process described above in relation to steps 308a-316 of FIG. 6. In particular, steps 308a-316 of FIG. 6 may be applied to the second complex carrier signal in order to generate the third complex carrier signal where, instead of applying a gauge delay 312, a time delay corresponding to the time period between successive pulses of the test signal is applied.

A weighting 412 is then applied to the third complex carrier signal, to ensure optimal stacking to maximise the final signal-to-noise ratio. For example, the weighting may be derived from a time average of the vector amplitude in the spatial location to which the respective third complex carrier signal is linked. This ensures that any vector addition can be optimally weighted as to maximise the resultant signal-to-noise ratio.

By processing each of the first complex carrier signals in this way, and noting that carrier signals may be represented as phasors, at an unperturbed location along the optical path each polarisation state has a third complex carrier phasor whose amplitude is proportional to the instantaneous amplitude of the second complex carrier phasor (though this can be weighted, as mentioned, to allow optimal stacking) but aligned along the neutral axis. Similarly, at a perturbed location along the optical path, the third complex carrier phasor has an angle proportional to the rate of change of the acoustic modulation or perturbation, which can be termed the instantaneous frequency, IF. This is true for both polarisation states and hence the third complex carrier signals from each polarisation channel are aligned and can be stacked, or summed, together. Stacking in the spatial domain is also possible to provide optimal SNR improvement, as aligned phasors are stacked with minimal signal distortion.

After a weighting 412 has been applied to the third complex carrier signals in each polarisation state, the third complex carrier signals from each polarisation state are summed 413 to produce a fourth complex carrier signal.

After this polarisation summing 413 (or stacking), the fourth complex carrier signal is then spatially decimated by a rolling addition in the spatial domain along the optical path. That is, adjacent samples of the fourth complex signal carrier are summed together. For example, eight samples of the third complex carrier signal may be summed, each corresponding to scattered signals that were scattered from adjacent locations. However, the number of fourth complex carrier samples that are summed together may be selected based on a desired spatial resolution of the measurement, and may also be dependent on the sampling rate, data rate and pulse length. This spatial stacking, or summation, generates a series of fifth complex carrier signals.

A rectangular-to-polar transform 416 may be applied to the fifth complex carrier signals in order to determine a value representative of the time differential of the spatial differential of phase for each of the respective locations along the optical path. Passing the fifth complex carrier signal through the rectangular-to-polar transform 416 may produce a signal that is representative of the instantaneous frequency (i.e. the rate of change of the spatial differential of the phase difference). The time differential of the spatial differential of phase for each location may be output at a respective channel 418, 420, 422. In order to recover the phase of the acoustic field which is affecting the optical path, a sum over time is performed, this is a sum of the time differential of the spatial differential of phase for each position over time as each pulse of light is launched along the optical path and processed.

Figure 8A:
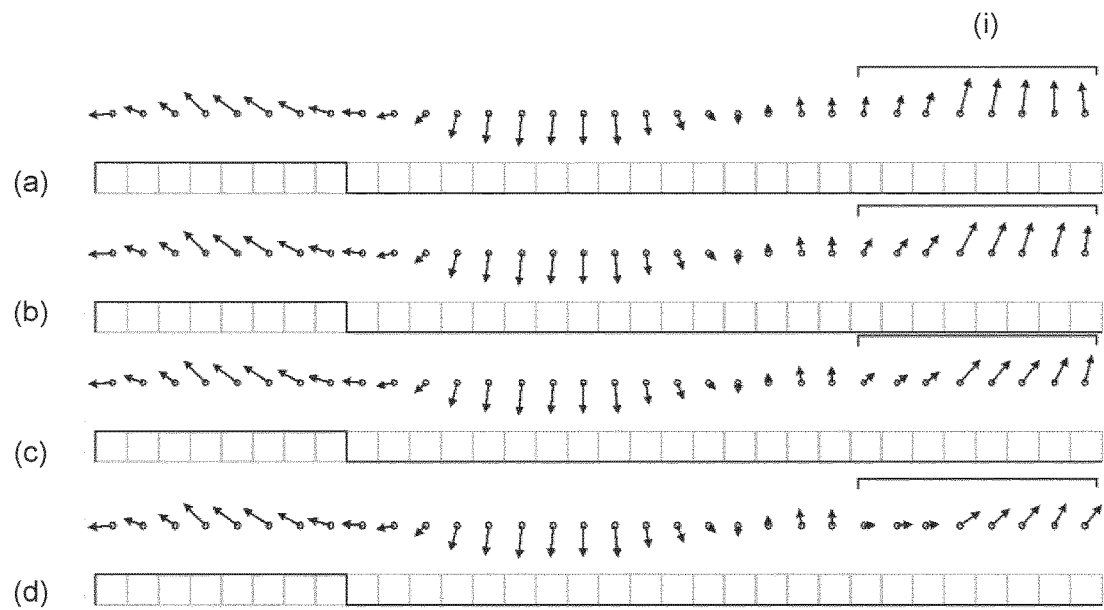
FIGS. 8(a)-8(c) each show vector representations of carrier signals during a signal processing method according to an embodiment of the present invention.

To illustrate the method outlined above, FIG. 8a shows a second complex carrier signal for a series of pulses (a)-(d), where each point of the signal along the optical path is represented as a vector showing the spatial differential of the phase difference between the local oscillator signal and the scattered signal. The optical path is depicted horizontally in FIGS. 8a-8c. In this example, the optical path is modulated by an acoustic frequency at section (i).

Figure 8B:
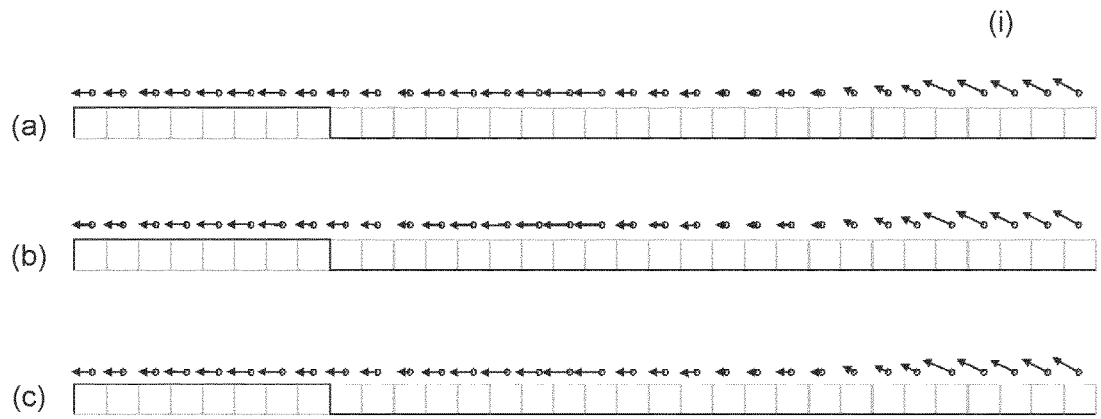

FIG. 8b shows a third complex carrier signal for a series of pulses (a)-(c), wherein the third complex carrier signal is modulated by a time differential of the spatial differential of the phase difference, where the time differential is taken over a time period between successive pulses of the test signal. Each point of the third complex carrier signal along the optical path is represented as a vector showing the time differential. It can be seen that all of the vectors are aligned along the neutral axis, except in section (i), where the optical path is modulated by an acoustic frequency and so the vectors are aligned at an angle equal to the rate of change of the modulation. It can also be seen that a weighting has been applied. As a result, the lengths of the vectors normalised relative to the time average of the amplitudes for each respective spatial location across pulses (a)-(d).

Figure 8C:
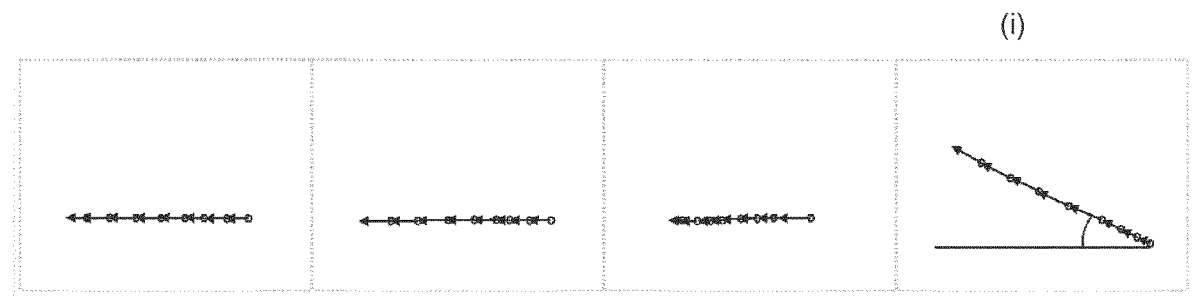

FIG. 8c shows the results of the spatial stacking process on a third complex carrier signal, for example signal (a) shown in FIG. 7b. The spatial stacking has produced fifth complex carrier signal, which is represented as a single vector for four sets of eight adjacent points of the optical path. This means that when R-P coordinate conversion is applied, the signal-to-noise ratio is greatly improved. The vector contains information of the phase difference for each of the respective sections along the optical path, and the acoustic modulation applied in section (i) can be clearly seen. By subjecting the fifth complex carrier signal to R-P coordinate conversion, the instantaneous frequency and amplitude of the acoustic modulation can be determined. By summing the instantaneous frequency over time as subsequent pulses are processed, the phase of the acoustic modulation can be recovered, as described above.

Processing signals in this way can, in some examples, lead to a large noise contribution which may affect performance of the method when low frequency modulations of the optical path are to be detected. This effect can be mitigated by limiting the rate at which the amplitude of the signals can be modulated by noise, in particular by normalising the vector length for each sample of the third complex carrier signal and, prior to spatial stacking, reweighting each vector sample by a low pass filtered measure of the vector amplitude for that location.

An alternative method, according to an embodiment of the present invention, to improve the signal-to-noise ratio prior to performing a rectangular-to-polar coordinate transform, which particularly helps to reduce noise contributions, is described below.

As before, a second complex carrier signal is generated from a first complex carrier signal, wherein the second complex carrier signal is modulated by a spatial differential of a phase difference in substantially the same manner as described above with respect to FIGS. 3-6. In order to process this signal, it is represented as a phasor for each sampled position along the optical path. For each pulse of light along the optical path, if the path is unperturbed the angle and length of the phasor for each position varies due to noise inherent in the measurement of a scattered signal and also the noise inherent in the processing, and so a set of scattered signals is obtained. In particular, the distribution of the phasor length and angle is equivalent to a Gaussian distribution. To account for this noise, a reference phasor is calculated, based on a time average of the phasor of the second complex carrier signal at each sampled position.

For example, considering a first spatial position, for each polarisation (horizontal and vertical), the reference phasor may be calculated by:

$$rPol_H = \langle Pol_H \rangle$$

$$rPol_V = \langle Pol_V \rangle$$

In the presence of an acoustic modulation which affects the optical path, the angle and length of a second complex carrier signal phasor is modulated symmetrically about this reference phasor. It should be noted that each spatial position from each polarisation state now has its own reference phasor, and the reference phasor may evolve slowly over time by recalculation of the time average. A low pass filter bandwidth may be set to ensure that the time average for calculating the reference phasor does not capture significant noise, but it should be set to ensure that the lowest frequency acoustic modulation will not be lost by this processing.

When the reference phasor for each spatial position from each polarisation state has been determined, a common stack reference phasor, which may be referred to herein as a common reference phasor, is found by summing reference phasors for each spatial position and/or polarisation to be considered. In particular, this may be calculated by:

$$rStack_{Common} = rPol_H + rPol_V$$

Once the common reference phasor is found, the second complex signal phasor at each moment in time for a given spatial position (the instantaneous phasor for each position and polarisation state) is rotated by an angle corresponding to a difference between the common reference phasor and the reference phasor associated with that spatial location and polarisation state. This produces a set of rotated phasors for all of the scattered signals at each position and for each polarisation.

This rotation can be performed as follows:

$$rotatedPol_H = Pol_H \cdot rStack_{Common} \cdot (rPol_H)^*$$

$$rotatedPol_V = Pol_V \cdot rStack_{Common} \cdot (rPol_V)^*$$

These rotated phasors can then the stacked or summed to generate a third complex carrier signal phasor, also known as a stacked carrier. This summation is demonstrated as follows:

$$stackedPol = rotatedPol_H + rotatedPol_V$$

Any number of phasors may be stacked at this stage, so this approach can be used to provide a spatial stack of eight spatial locations in a similar manner as discussed above. However, this method not only allows stacking over polarisation states and spatial location, but can be used to stack phase modulated carrier signals from multiple optical sources, multiple RF carriers and the like. Since this stacking operation is performed prior to R-P coordinate transformation, the signal-to-noise ratio improvements can extend operational range of an acoustic sensing system as well as the noise spectral density which is achieved.

Although a few preferred embodiments have been shown and described, it will be appreciated by those skilled in the art that various changes and modifications might be made without departing from the scope of the invention, as defined in the appended claims.

All of the features disclosed in this specification (including any accompanying claims, abstract and drawings), and/or all of the steps of any method or process so disclosed, may be combined in any combination, except where at least some of such features and/or steps are mutually exclusive.

Each feature disclosed in this specification (including any accompanying claims, abstract and drawings) may be replaced by alternative features serving the same, equivalent or similar purposes, unless expressly stated otherwise. Thus, unless expressly stated otherwise, each feature disclose is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A signal processing method for a distributed acoustic sensing system, the method comprising:
   transmitting a pulsed test signal along an optical path;
   receiving, at a detector stage, a scattered signal that was scattered at a location along the optical path;
   receiving, at the detector stage, a local oscillator signal;
   generating, based on an interference of the scattered signal and the local oscillator signal, a first complex carrier signal that is modulated by a phase difference between the local oscillator signal and the scattered signal;
   processing the first complex carrier signal to generate a second complex carrier signal that is modulated by a spatial differential of the phase difference, the spatial differential being taken along a length of the optical path; and
   determining, based on the second complex carrier signal, a value representative of the spatial differential of the phase difference for the location along the optical path.

2. A method according to claim 1, wherein the determining step includes applying a rectangular to polar coordinate transform to the second complex carrier signal.

3. A method according to claim 2, wherein applying the rectangular to polar coordinate transform to the second complex carrier signal includes passing the second complex carrier signal through a digital down conversion stage.

4. A method according to claim 1, wherein processing the first complex carrier signal comprises multiplying a complex conjugate of the first complex carrier signal with a delayed copy of the first complex carrier signal, to generate the second complex carrier signal.

5. A method according to claim 1, wherein processing the first complex carrier signal comprises digitally simulating interference of the first complex carrier signal with a delayed copy of the first complex carrier signal, to generate the second complex carrier signal.

6. A method according to claim 5, wherein digitally simulating interference of the first complex carrier signal with a delayed copy of the first complex carrier signal comprises:
   generating a copy of the first complex carrier signal, wherein a frequency shift is introduced between the first complex carrier signal and the copy of the first complex carrier signal, and wherein the copy of the first complex carrier signal is delayed relative to the first complex carrier signal;
   adding the first complex carrier signal and the copy of the first complex carrier signal together to produce a summed complex carrier signal; and
   multiplying the summed complex carrier signal with a complex conjugate of the summed complex carrier signal, to generate the second complex carrier signal.

7. A method according to claim 6, wherein the frequency shift is larger than a bandwidth required to represent scattering of the test signal along the optical path.

8. A method according to claim 1, wherein:
   the pulsed test signal includes a first test pulse and a second test pulse, wherein the second test pulse is delayed relative to the first test pulse and the first test pulse and the second test pulse have different frequencies;
   the scattered signal includes a first scattered signal corresponding to the first test pulse and a second scattered signal corresponding to the second test pulse;
   the step of generating a first complex carrier signal includes generating a first complex carrier signal associated with the first scattered signal and a first complex carrier signal associated with the second scattered signal;
   the step of processing the first complex carrier signal includes processing the first complex carrier signal associated with the first scattered pulse and the first complex carrier signal associated with the second scattered pulse to generate the second complex carrier signal.

9. A method according to claim 8, wherein processing the first complex carrier signal associated with the first scattered signal and the first complex carrier signal associated with the second scattered signal includes multiplying the first complex carrier signal associated with the first scattered signal by a complex conjugate of the first complex carrier signal associated with the second scattered signal.

10. A signal processing method for a distributed acoustic sensing system, the method comprising:
    transmitting, a pulsed test signal along an optical path;
    receiving, at a detector stage, a set of scattered signals, wherein each scattered signal in the set of scattered signals was scattered at a respective location along the optical path;
    receiving, at the detector stage, a local oscillator signal; and
    for each of the scattered signals in the set of scattered signals:
      generating, based on an interference of that scattered signal and the local oscillator signal, a first complex carrier signal associated with that scattered signal, the first complex carrier signal being modulated by a phase difference between the local oscillator signal and that scattered signal;
      processing the first complex carrier signal to generate a second complex carrier signal associated with that scattered signal, the second complex carrier signal being modulated by a spatial differential of the phase difference, the spatial differential being taken along a length of the optical path; and
      processing the second complex carrier signal to generate a third complex carrier signal associated with that scattered signal, the third complex carrier signal being modulated by a time differential of the spatial differential of the phase difference, the time differential being over a time period between successive pulses of the test signal; and
    summing two or more of the third complex carrier signals to generate a fourth complex carrier signal; and
    determining, based on the fourth complex carrier signal, a value representative of the time differential of the spatial differential of the phase difference for one or more of the respective locations along the optical path.

11. A method according to claim 10, wherein the determining step includes applying a rectangular to polar coordinate transform to the fourth complex carrier signal.

12. A method according to claim 10, wherein processing the second complex carrier signal comprises multiplying a complex conjugate of the second complex carrier signal with a copy of the second complex carrier signal that is delayed by a time period between successive pulses of the pulsed test signal, to generate the third complex carrier signal.

13. A method according to claim 10, wherein processing the second complex carrier signal comprises digitally simulating interference of the second complex carrier signal with a copy of the second complex carrier signal that is delayed by a time period between successive pulses of the pulsed test signal, to generate the third complex carrier signal.

14. A method according to claim 13, wherein digitally simulating interference of the second complex carrier signal with a delayed copy of the second complex carrier signal comprises:

generating a copy of the second complex carrier signal, wherein a frequency shift is introduced between the second complex carrier signal and the copy of the second complex carrier signal, and wherein the copy of the second complex carrier signal is delayed relative to the second complex carrier signal by an amount corresponding to the time period between successive pulses of the pulsed test signal;

adding the second complex carrier signal and the copy of the second complex carrier signal together to produce a summed complex carrier signal; and multiplying the summed complex carrier signal with a complex conjugate of the summed complex carrier signal, to generate the third complex carrier signal.

15. A method according to claim 10, wherein each of the respective locations at which the scattered signals were scattered is located within a chosen length of the optical path.

16. A signal processing method for a distributed acoustic sensing system, the method comprising:

transmitting a pulsed test signal along an optical path;
receiving, at a detector stage, a scattered signal that was scattered at a location along the optical path;
receiving, at the detector stage, a local oscillator signal;
splitting the local oscillator signal or the scattered signal into a first polarisation state and a second polarisation state;
for each of the first polarisation state and second polarisation state:
generating, based on an interference of the scattered signal and the local oscillator signal, a first complex carrier signal associated with that polarisation state, the first complex carrier signal being modulated by a phase difference between the local oscillator signal and the scattered signal;
processing the first complex carrier signal to generate a second complex carrier signal associated with that polarisation state, the second complex carrier signal being modulated by a spatial differential of the phase difference, the spatial differential being taken along a length of the optical path; and
processing the second complex carrier signal to generate a third complex carrier signal associated with that polarisation state, the third complex carrier signal being modulated by a time differential of the spatial differential of the phase difference, the time differential being over a time period between successive pulses of the test signal; and
summing the third complex carrier signal associated with the first polarisation state and the third complex carrier signal associated with the second polarisation state to generate a fourth complex carrier signal; and
determining, based on the fourth complex carrier signal, a value representative of the time differential of the spatial differential of the phase difference for the location along the optical path.

17. A method according to claim 16, wherein:
the scattered signal includes a set of scattered signals, wherein each scattered signal in the set of scattered signals was scattered at a respective location along the optical path;
the steps for generating a fourth complex carrier signal are performed for each of the scattered signals to generate a respective fourth complex carrier signal associated with each of the scattered signals;
the determining step includes summing two or more of the respective fourth complex carrier signals to generate a fifth complex carrier signal, and determining, based on the fifth complex carrier signal, a value representative of the time differential of the spatial differential of the phase difference for one or more of the respective locations along the optical path.

18. A signal processing method for a distributed acoustic sensing system, the method comprising:

transmitting a pulsed test signal along an optical path;
receiving, at a detector stage, a set of scattered signals, wherein each scattered signal in the set of scattered signals was scattered at a respective location along the optical path;
receiving, at the detector stage, a local oscillator signal; and
for each of two or more of the scattered signals in the set of scattered signals:
generating, based on an interference of that scattered signal and the local oscillator signal, a first complex carrier signal associated with that scattered signal, the first complex carrier signal being modulated by a phase difference between the local oscillator signal and that scattered signal;
processing the first complex carrier signal to generate a second complex carrier signal associated with that scattered signal, the second complex carrier signal being modulated by a spatial differential of the phase difference, the spatial differential being taken along a length of the optical path;
representing the second complex carrier signal associated with that scattered signal as a phasor;
determining a reference phasor associated with that scattered signal, based on a time average of the phasor;
rotating the phasor by an angle corresponding to a difference between a common reference phasor and the reference phasor associated with that scattered signal;
wherein the common reference phasor is determined based on a sum of the reference phasors determined for the two or more scattered signals;
the method further comprising:
summing the rotated phasors to generate a third complex carrier signal; and
determining, based on the third complex carrier signal, a value representative of the spatial differential of the phase difference for one or more of the respective locations along the optical path.

19. A signal processing method for a distributed acoustic sensing system, the method comprising:

transmitting, a pulsed test signal along an optical path;
receiving, at a detector stage, a scattered signal that was scattered at a location along the optical path;
receiving, at the detector stage, a local oscillator signal;
splitting the local oscillator signal or the scattered signal into a first polarisation state and a second polarisation state;
for each of the first polarisation state and second polarisation state:
generating, based on an interference of the scattered signal and the local oscillator signal a first complex carrier signal associated with that polarisation state, the first complex carrier signal being modulated by a phase difference between the local oscillator signal and the scattered signal;

processing the first complex carrier signal to generate a second complex carrier signal associated with that polarisation state, the second complex carrier signal being modulated by a spatial differential of the phase difference, the spatial differential being taken along a length of the optical path;

representing the second complex carrier signal associated with that polarisation state as a phasor;

determining a reference phasor associated with that polarisation state based on a time average of the phasor;

rotating the phasor by an angle corresponding to a difference between a common reference phasor and the reference phasor associated with that polarisation state;

wherein the common reference phasor is determined based on a sum of the reference phasor associated with the first polarisation state and the reference phasor associated with the second polarisation state;

the method further comprising:

summing the rotated phasors associated with the first polarisation state and the second polarisation state to generate a third complex carrier signal; and determining, based on the third complex carrier signal, a value representative of the spatial differential of the phase difference for the location along the optical path.

20. A method according to claim 19, wherein:

the scattered signal includes a set of scattered signals, wherein each scattered signal in the set of scattered signals was scattered at a respective location along the optical path;

the steps for generating a third complex carrier signal are performed for each of the scattered signals to generate a respective third complex carrier signal associated with each of the two or more scattered signals;

the determining step includes summing two or more of the respective third complex carrier signals to generate a fourth complex carrier signal, and determining, based on the fourth complex carrier signal, a value representative of the spatial differential of the phase difference for one or more of the respective locations along the optical path.

21. A distributed acoustic sensing system comprising:

a pulse generator configured to transmit a pulsed test signal along an optical path;

a detector stage configured to receive a test signal that was scattered along an optical path and a local oscillator signal; and a controller configured to perform a method according to claim 1.

22. A distributed acoustic sensing according to claim 21, wherein the optical detection system is a heterodyne detection system, wherein a frequency of the test signal is shifted relative to a frequency of the local oscillator signal.

* * * * *